US012260658B1

(12) United States Patent
Kinsey

(10) Patent No.: US 12,260,658 B1
(45) Date of Patent: Mar. 25, 2025

(54) MANAGED VIDEO CAPTURE

(71) Applicant: Capital One Services, LLC, McLean, VA (US)

(72) Inventor: Timothy Kinsey, New York, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/808,184

(22) Filed: Aug. 19, 2024

Related U.S. Application Data

(63) Continuation of application No. 18/584,453, filed on Feb. 22, 2024, now Pat. No. 12,106,590.

(51) Int. Cl.
| | |
|---|---|
| *G06V 30/10* | (2022.01) |
| *G01S 17/89* | (2020.01) |
| *G06T 7/20* | (2017.01) |
| *G06T 7/70* | (2017.01) |
| *H04N 21/2187* | (2011.01) |

(52) U.S. Cl.
CPC .............. *G06V 30/10* (2022.01); *G01S 17/89* (2013.01); *G06T 7/20* (2013.01); *G06T 7/70* (2017.01); *H04N 21/2187* (2013.01)

(58) Field of Classification Search
CPC ........... G06V 30/10; G01S 17/89; G06T 7/20; G06T 7/70; H04N 21/2187
See application file for complete search history.

(56) References Cited

U.S. PATENT DOCUMENTS

| | | | |
|---|---|---|---|
| 7,391,934 B2 | 6/2008 | Goodall et al. | |
| 7,421,107 B2 | 9/2008 | Lugg | |
| 7,526,117 B2 | 4/2009 | Foth et al. | |
| 7,587,066 B2 | 9/2009 | Cordery et al. | |
| 7,698,222 B1 | 4/2010 | Bueche | |

(Continued)

FOREIGN PATENT DOCUMENTS

| | | | | |
|---|---|---|---|---|
| JP | 2020021419 A | | 2/2020 | |
| KR | 102570769 | * | 8/2023 | ............. G06Q 20/18 |
| KR | 102570769 B1 | | 8/2023 | |

OTHER PUBLICATIONS

Rose, Lydia M. "Modernizing check fraud detection with machine learning." PhD dissertation. Utica College. 2018, (provided by applicatnt on IDS) (Year: 2018).*

(Continued)

*Primary Examiner* — Amara Abdi
(74) *Attorney, Agent, or Firm* — Sterne, Kessler, Goldstein & Fox P.L.L.C.

(57) ABSTRACT

A computer implemented method, system, and non-transitory computer-readable device that may be used in a remote deposit environment. Upon receiving a user request, based on interactions with the UI, the method implements an electronic deposit of a financial instrument by activating a camera on the client device to generate a live video stream of image data of a field of view of at least one camera, wherein the live video stream includes imagery of at least a portion of each side of the financial instrument. The method continues by extracting data fields based on the formation of image objects of each side of the financial instrument from the live video stream of image data. A flip detection pauses the forming of image objects during the flip. The extracted data fields are communicated to a remote deposit server to complete the remote deposit.

20 Claims, 10 Drawing Sheets

(56) References Cited

U.S. PATENT DOCUMENTS

| | | | |
|---|---|---|---|
| 7,702,588 B2 | 4/2010 | Gilder et al. | |
| 7,734,545 B1 | 6/2010 | Fogliano et al. | |
| 7,818,307 B1 | 10/2010 | Young et al. | |
| 7,856,402 B1 | 12/2010 | Kay | |
| 7,905,396 B2 | 3/2011 | Tidwell et al. | |
| 7,949,587 B1 | 5/2011 | Morris et al. | |
| 8,027,928 B1 | 9/2011 | Hecht, Jr. et al. | |
| 8,050,997 B1 | 11/2011 | Nosek et al. | |
| 8,060,442 B1 | 11/2011 | Hecht et al. | |
| 8,104,676 B2 | 1/2012 | Ramachandran | |
| 8,107,135 B2* | 1/2012 | Moore | G06K 13/16 358/408 |
| 8,271,381 B2 | 9/2012 | O'Brien et al. | |
| 8,290,876 B1 | 10/2012 | Powell | |
| 8,296,230 B2 | 10/2012 | Davis et al. | |
| 8,300,917 B2 | 10/2012 | Borgia et al. | |
| 8,332,329 B1 | 12/2012 | Thiele | |
| 8,406,500 B2 | 3/2013 | Najari et al. | |
| 8,464,933 B1 | 6/2013 | Prasad et al. | |
| 8,582,862 B2 | 11/2013 | Nepomniachtchi et al. | |
| 8,605,982 B2 | 12/2013 | Jackson et al. | |
| 8,626,661 B2 | 1/2014 | Gilder | |
| 8,632,001 B1 | 1/2014 | Ramachandran et al. | |
| 8,638,363 B2 | 1/2014 | King et al. | |
| 8,708,227 B1 | 4/2014 | Oakes, III et al. | |
| 8,745,073 B2 | 6/2014 | Mulligan et al. | |
| 8,811,711 B2 | 8/2014 | Calman et al. | |
| 8,958,605 B2 | 2/2015 | Amtrup et al. | |
| 8,959,033 B1 | 2/2015 | Oakes, III et al. | |
| 8,983,170 B2 | 3/2015 | Nepomniachtchi et al. | |
| 8,995,012 B2 | 3/2015 | Heit et al. | |
| 9,064,248 B2 | 6/2015 | Huff et al. | |
| 9,324,073 B2 | 4/2016 | Nepomniachtchi et al. | |
| 9,384,392 B2 | 7/2016 | Weber et al. | |
| 9,483,761 B2 | 11/2016 | Brendell et al. | |
| 9,558,493 B2 | 1/2017 | Carrott | |
| 9,569,756 B1 | 2/2017 | Bueche, Jr. et al. | |
| 9,640,041 B2 | 5/2017 | Block et al. | |
| 9,652,690 B2 | 5/2017 | Eid et al. | |
| 9,672,510 B2 | 6/2017 | Roach et al. | |
| 9,679,281 B2 | 6/2017 | Moshal | |
| 9,684,920 B1 | 6/2017 | Kalgi et al. | |
| 9,721,177 B2 | 8/2017 | Lee et al. | |
| 9,747,509 B2 | 8/2017 | Eid et al. | |
| 9,779,392 B1* | 10/2017 | Prasad | G06Q 20/0425 |
| 9,807,263 B2 | 10/2017 | Bala et al. | |
| 9,852,406 B2 | 12/2017 | Doyle et al. | |
| 9,852,409 B2 | 12/2017 | Artman et al. | |
| 10,026,119 B2 | 7/2018 | Green et al. | |
| 10,032,141 B1* | 7/2018 | Haider | G06Q 20/3276 |
| 10,192,108 B2 | 1/2019 | Nepomniachtchi et al. | |
| 10,210,522 B1 | 2/2019 | Medina, III et al. | |
| 10,217,375 B2 | 2/2019 | Waldron et al. | |
| 10,223,243 B2* | 3/2019 | Harbinson | G06F 8/65 |
| 10,402,790 B1 | 9/2019 | Clark et al. | |
| 10,460,381 B1 | 10/2019 | Pollack et al. | |
| 10,504,185 B1 | 12/2019 | Buentello | |
| 10,552,810 B1 | 2/2020 | Ethington et al. | |
| 10,635,898 B1 | 4/2020 | Pribble et al. | |
| 10,692,230 B2 | 6/2020 | Anderson et al. | |
| 10,699,146 B2 | 6/2020 | Shustorovich et al. | |
| 10,706,466 B1 | 7/2020 | Ethington et al. | |
| 10,762,579 B2 | 9/2020 | Riechers et al. | |
| 10,769,598 B1 | 9/2020 | Oakes, III et al. | |
| 10,789,496 B2 | 9/2020 | Kotovich et al. | |
| 10,853,771 B2 | 12/2020 | Enobakhare | |
| 10,855,914 B1 | 12/2020 | Prasad et al. | |
| 10,909,362 B2 | 2/2021 | Nepomniachtchi et al. | |
| 11,030,752 B1 | 6/2021 | Backlund et al. | |
| 11,064,111 B1 | 7/2021 | Prasad et al. | |
| 11,068,867 B1 | 7/2021 | Tucker | |
| 11,068,976 B1* | 7/2021 | Voutour | G06T 5/40 |
| 11,126,975 B2 | 9/2021 | Haldenby et al. | |
| 11,127,008 B1 | 9/2021 | Buentello et al. | |
| 11,145,169 B2 | 10/2021 | Pratten et al. | |
| 11,157,731 B2 | 10/2021 | Nepomniachtchi et al. | |
| 11,159,733 B2 | 10/2021 | Mukul | |
| 11,200,550 B1 | 12/2021 | Singfield | |
| 11,210,379 B1 | 12/2021 | Lindley et al. | |
| 11,216,884 B1 | 1/2022 | Buentello | |
| 11,244,319 B2 | 2/2022 | Navarro et al. | |
| 11,282,086 B1 | 3/2022 | Medina, III et al. | |
| 11,288,661 B2 | 3/2022 | Hammad et al. | |
| 11,295,377 B1 | 4/2022 | Ethington et al. | |
| 11,295,378 B1 | 4/2022 | Voutour et al. | |
| 11,315,217 B2 | 4/2022 | Ilic et al. | |
| 11,321,709 B1 | 5/2022 | Kolchin | |
| 11,373,150 B1 | 6/2022 | Bueche, Jr. et al. | |
| 11,449,841 B1 | 9/2022 | Srinivasarangan et al. | |
| 11,516,383 B2 | 11/2022 | Ilic et al. | |
| 11,531,973 B1 | 12/2022 | Prasad et al. | |
| 11,562,332 B1 | 1/2023 | Oakes, III et al. | |
| 11,610,294 B2 | 3/2023 | Dewitt et al. | |
| 11,640,627 B2 | 5/2023 | Fotso et al. | |
| 11,676,285 B1 | 6/2023 | Backlund et al. | |
| 11,682,222 B1 | 6/2023 | Oakes, III et al. | |
| 11,694,268 B1 | 7/2023 | Buentello | |
| 11,704,627 B2 | 7/2023 | Gordon et al. | |
| 11,710,210 B1 | 7/2023 | Medina, III | |
| 11,829,962 B2 | 11/2023 | Burnam et al. | |
| 2005/0283444 A1 | 12/2005 | Ekberg | |
| 2006/0036537 A1 | 2/2006 | Lawrence et al. | |
| 2008/0140579 A1 | 6/2008 | Agarwal | |
| 2009/0171839 A1 | 7/2009 | Rosano et al. | |
| 2012/0040717 A1 | 2/2012 | Levy et al. | |
| 2013/0054461 A1 | 2/2013 | Gupta et al. | |
| 2013/0198069 A1 | 8/2013 | Latimer | |
| 2013/0204783 A1 | 8/2013 | Klose et al. | |
| 2014/0074697 A1 | 3/2014 | Foster | |
| 2014/0114852 A1 | 4/2014 | Rajagopal et al. | |
| 2014/0122332 A1 | 5/2014 | Viera et al. | |
| 2014/0236767 A1 | 8/2014 | Duggal et al. | |
| 2015/0032626 A1 | 1/2015 | Dill et al. | |
| 2015/0120564 A1 | 4/2015 | Smith et al. | |
| 2017/0270508 A1 | 9/2017 | Roach et al. | |
| 2017/0336511 A1 | 11/2017 | Nerurkar | |
| 2020/0042955 A1 | 2/2020 | Widdows | |
| 2020/0334647 A1 | 5/2020 | Malhotra et al. | |
| 2020/0389600 A1 | 12/2020 | Capurso et al. | |
| 2021/0174361 A1 | 6/2021 | Potireddy et al. | |
| 2021/0360149 A1 | 11/2021 | Mukul | |
| 2022/0245985 A1 | 8/2022 | Bhutani et al. | |
| 2022/0277291 A1 | 9/2022 | Roongta et al. | |
| 2022/0335393 A1 | 10/2022 | Gupta et al. | |
| 2022/0343301 A1 | 10/2022 | Edwards et al. | |
| 2022/0358575 A1 | 11/2022 | Smith | |
| 2023/0060395 A1 | 3/2023 | Roach et al. | |
| 2023/0060464 A1 | 3/2023 | Ceesay | |
| 2023/0084370 A1 | 3/2023 | Bradford | |
| 2023/0133158 A1 | 5/2023 | Kolchin | |
| 2023/0196319 A1 | 6/2023 | Ng et al. | |
| 2023/0196706 A1 | 6/2023 | Scott | |
| 2023/0209116 A1 | 6/2023 | Leung et al. | |
| 2023/0281629 A1 | 9/2023 | Shevyrev et al. | |
| 2023/0289808 A1 | 9/2023 | Kolchin | |
| 2023/0351782 A1 | 11/2023 | Fitzgerald | |
| 2024/0362794 A1* | 10/2024 | Schloter | G06T 5/50 |

OTHER PUBLICATIONS

Rose, Lydia M. "Modernizing check fraud detection with machine learning." PhD dissertation. Utica College. 2018.

remotedepositcapture.com, "Ensenta Business Mobile with Multi-Check", Available from the Internet at https://www.remotedepositcapture.com/RDC/media/RDC-Forum/Submitted-Sponsor-Brochures/EnsentaBusinessMobileMultiCheck-e-_2018_2_14_12_52_3.pdf, [site visited on May 19, 2023], pp. 1-2.

Bills, Steve, "Automated Amount Scanning Is Trend in Remote-Deposit," American Banker, New York, NY, Aug. 30, 2005, (3 pgs).

Dunga et al. "Electronic Booking and Payment Platforms for Inter-Campus E-Bikes". Engineering Proceedings. Jul. 14, 2023. pp. 1-14. vol. 41, Issue 12.

(56) References Cited

OTHER PUBLICATIONS

Aletihadpayments "Aani | Split the bill with your friends". Oct. 16, 2023. Located via YouTube, free copy available at https://www.youtube.com/watch?v=_wys 12-0KmE.

Katariya. "Mastering QR Code Payments: A Guide to Seamless and Effortless Transactions". Jun. 12, 2023. Located via Google Web, free copy available at https://www.mooninvoice.com/blog/qr-code-payments/.

PayBy. "PayBy: Payment at Your Fingertips". Retrieved from the Internet on Dec. 21, 2023. Located via Google Web, free copy available at https://www.payby.com/split-bills.

Natwest. "Request money from someone or split a bill". Retrieved from the Internet on Dec. 21, 2023. Located via Google Web, free copy available at https://www.natwest.com/waystopay/payme.html.

Spoton. "QR Scan & Pay / Order & Pay | SpotOn Order". Jul. 19, 2023. Located via Google Web, free copy available at https://help.spoton.com/space/SK/2457829381/QR+Scan+%26+Pay+%2F+Order+%26+Pay+%7C+SpotOn+Order.

Spoton. "QR Split Payment | SpotOn Order". Jul. 19, 2023. Located via Google Web, free copy available at https://help.spoton.com/space/SK/2262565040/QR+Split+Payment+%7C+SpotOn+Order.

photo.stackexchange.com, "What of those EXIF values tell me more about my image's quality?" Jul. 8, 2017, Photography Stack Exchange, Located via Google Web, available at https://photo.stackexchange.com/questions/90730/what-of-those-exif-values-tell-me-more-about-my-images-quality.

\* cited by examiner

MANAGED VIDEO CAPTURE

CROSS-REFERENCE TO RELATED APPLICATIONS

This application is a continuation of U.S. application Ser. No. 18/584,453, filed Feb. 22, 2024, which is hereby incorporated by reference in its entirety.

BACKGROUND

As financial technology evolves, banks, credit unions and other financial institutions have found ways to make online banking and digital money management more convenient for users. Mobile banking apps may let you check account balances and transfer money from your mobile device. In addition, a user may deposit paper checks from virtually anywhere using their smartphone or tablet. However, users may have to take pictures and have them processed remotely.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
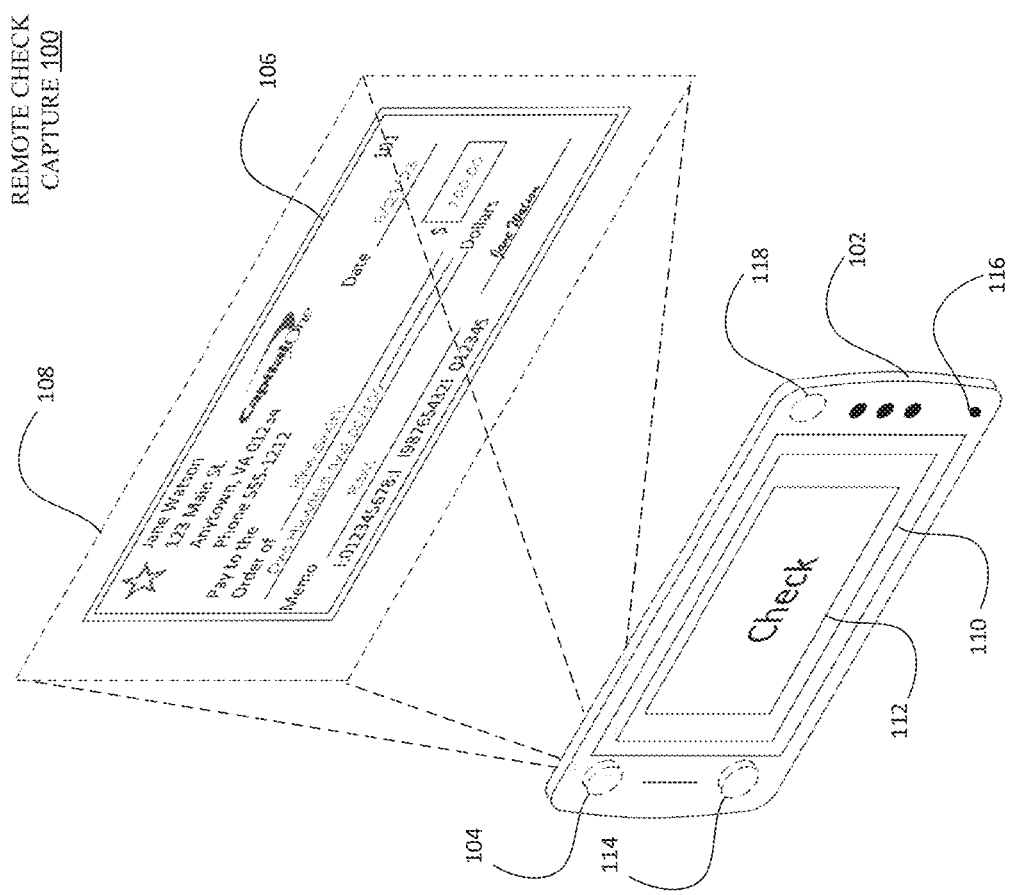
FIG. 1 illustrates an example remote deposit check capture, according to some embodiments and aspects.

Disclosed herein are system, apparatus, device, method, computer program product embodiments, and/or combinations and sub-combinations thereof, for two-sided financial instrument capture on a mobile device or desktop computing device based on video, as managed by flip detection processes. While described in the context of financial instrument capture, the disclosed technology may be applied to any other two-sided document. The disclosed technology may be used to process images of documents during transactions, such as assisting, in real-time or near real-time, a customer to electronically deposit a financial instrument, such as a check. The captured video images may be formed into image objects and be processed by OCR system. OCR includes the electronic or mechanical conversion of images of typed, handwritten, or printed text into machine-encoded text, whether from a scanned document, a photo of a document, a scene photo, a video stream of image data, etc. Using the technology described herein, data (e.g., check amount, signature, MICR line, account number, etc.) may be extracted in real-time or near-real-time from a live video stream of a check, or portions of the check (e.g., partial check images).

Mobile check deposit is a convenient way to deposit funds using a customer's mobile device or laptop. As technology and digital money management tools continue to evolve, the process has become safer and easier. Mobile check deposit is a way to deposit a financial instrument, e.g., a paper check, through a banking app using a smartphone, tablet, laptop, etc. In existing systems, mobile deposit may request a customer to capture a plurality of pictures of a check using, for example, their smartphone or tablet camera and upload it through a mobile banking app running on the mobile device. Deposits commonly include personal, business, or government checks.

Many banks and financial institutions use advanced security features to keep an account safe from fraud during the mobile check deposit workflow. For example, security measures may include encryption and device recognition technology. In addition, remote check deposit apps typically capture check deposit information without storing the check images on the customer's mobile device (e.g., smartphone). Mobile check deposit may also eliminate or reduce typical check fraud as a thief of the check may not be allowed to subsequently make use of an already electronically deposited check, whether it has cleared or not and may provide an alert to the banking institution of a second deposit attempt. In addition, fraud controls may include mobile security alerts, such as mobile security notifications or SMS text alerts, which can assist in uncovering or preventing potentially fraudulent activity.

In current remote deposit systems and processes, computer-based (e.g., laptop) or mobile-based (e.g., mobile device) technology allows a user to initiate a document uploading process for uploading an image(s) or other electronic versions of a document to a backend system (e.g., a document processing system) for various purposes, including evaluating the quality of the captured image(s). This current process has disadvantages, such as, requiring the customer to capture and communicate check imagery and, if determined to be of poor quality, following-up with additional images. This is inefficient and consumes system and network resources that otherwise could be allocated to other tasks. Alternatively, a frustrated user may take their deposit to another financial institution, causing a potential duplicate presentment or fraud issue.

The technology described herein actively processes live camera video of a financial instrument located within the camera field of view, allowing, for example, the user to simplify the image capture process. In one aspect, the live camera video imagery is streamed as encoded data configured in byte arrays (e.g., as a byte array output video stream object). This imagery may be processed continuously, or alternatively, the imagery may be stored temporarily within memory of the mobile device, such as, in a frame or video buffer.

In embodiments disclosed herein, a flip detection mechanism determines that a financial instrument (e.g., check) is flipped (or turned over) from one side to another during live streamed video capture and image object build (e.g., byte arrays). For example, a check at rest on a surface is determined to be in a steady state, deviates from the steady state during a flipping action, and then achieves the steady state again at completion of the flip process.

In one aspect, a LIDAR based sensor resident on a client device manages image object capture sequences. For example, the customer initiates a remote deposit process by opening an application (App) and then making a request to deposit a check. The process, once initiated, activates a camera on the client device to begin capturing a raw live video stream. A LIDAR sensor may determine that a check is within a known distance or distance range for proper capture (e.g., in focus) and is not moving. While the client device is forming image objects (e.g., frames) from the raw live streamed video, the LIDAR sensor may recognize a check position sequence of first-side facing, flipping action, and second-side facing. The LIDAR sensor will, in some aspects, pause image object (e.g., byte array) building during the detected flipping action and restart the image object building after flip completion. Implementing the technology disclosed herein, at least a portion of a remote deposit process will be locally processed to capture video with flip detection. These processes may be directed by a mobile banking app or other image processing app and the video processed by an OCR process in real-time or near real-time.

This technical solution may eliminate requiring the customer to capture and communicate individual images, and thus is more efficient, requires less system and network resources, improves user experience, and may reduce instances of accidental duplicate check presentation. In some embodiments, the technology described herein continuously evaluates a quality of a video stream of image data from an activated camera of a mobile device or other customer device. One or more high quality image frames (e.g., entire image of check image), or portions thereof, may be OCR processed to extract data fields locally or, alternatively, in a remote OCR process.

In some embodiments and aspects disclosed herein, the OCR process may be implemented with an active OCR process using a mobile device, instead of after submission of imagery to a backend remote deposit system. However, other known and future OCR applications may be substituted without departing from the scope of the technology disclosed herein.

In some aspects, the technology disclosed herein implements "Active OCR" as further described in U.S. application Ser. No. 18/503,778, entitled "Active OCR," filed Nov. 7, 2023, and incorporated by reference in its entirety. Active OCR, as further described in FIGS. 3-5, includes performing OCR processing on image objects formed from a raw live video stream of image data originating from an activated camera on a client device. The image objects may capture portions of a check or an entire image of the check. As a portion of a check image is formed into a byte array, it may be provided to the active OCR system to extract any data fields found within the byte array in real-time or near real-time. In a non-limiting example, if the live video streamed image data contains an upper right corner of a check formed in a byte array, the byte array may be processed by the active OCR system to extract the origination date of the check.

In some embodiments, the camera continuously streams video for each side of the check data until all of the data fields have been extracted from the imagery. In some embodiments, various check framing elements, such as a border or corners, assist in alignment of continuously video streaming data fields, corresponding Byte Array Output Video stream objects, and flip detection. In some embodiments, success of the OCR extraction process may be determined based on reaching an extraction quality threshold. For example, if a trained machine learning (ML) OCR model reaches a determination of 85% surety of a correct data field extraction, then the OCR process for that field may be considered complete. Utilizing this capability, the OCR data may be communicated to a banking backend for additional remote deposit processing. Implementing the technology disclosed herein, the deposit may be processed by a mobile banking app and a remote deposit status rendered on a user interface (UI) mid-experience (for example, at or around the time that the user captures an image of the check for remote deposit). Alternatively, or in addition to, portions of the remote deposit sequence may be processed locally on the client device.

Figure 3:
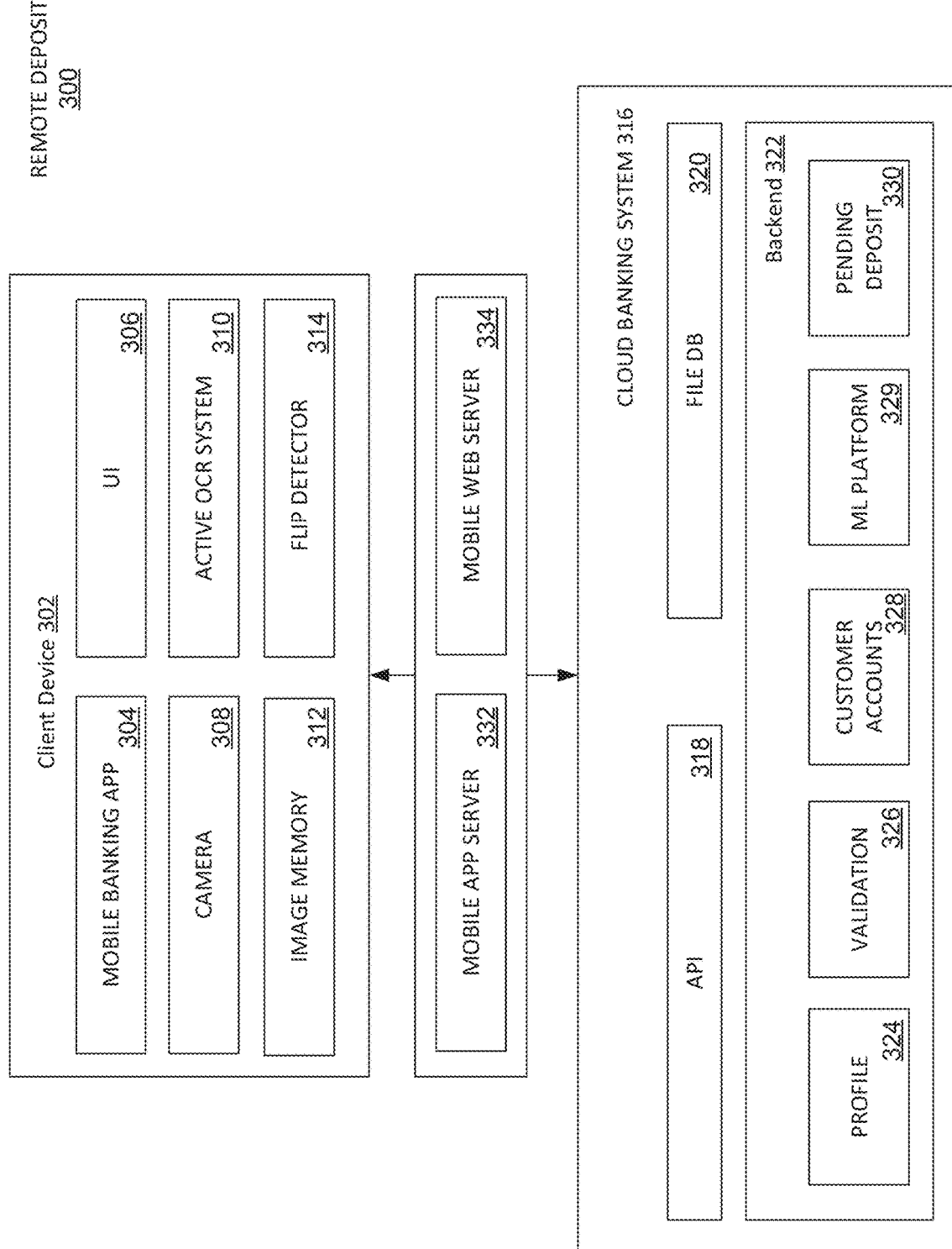
FIG. 3 illustrates a block diagram of a remote deposit system architecture, according to some embodiments and aspects.
Figure 4:
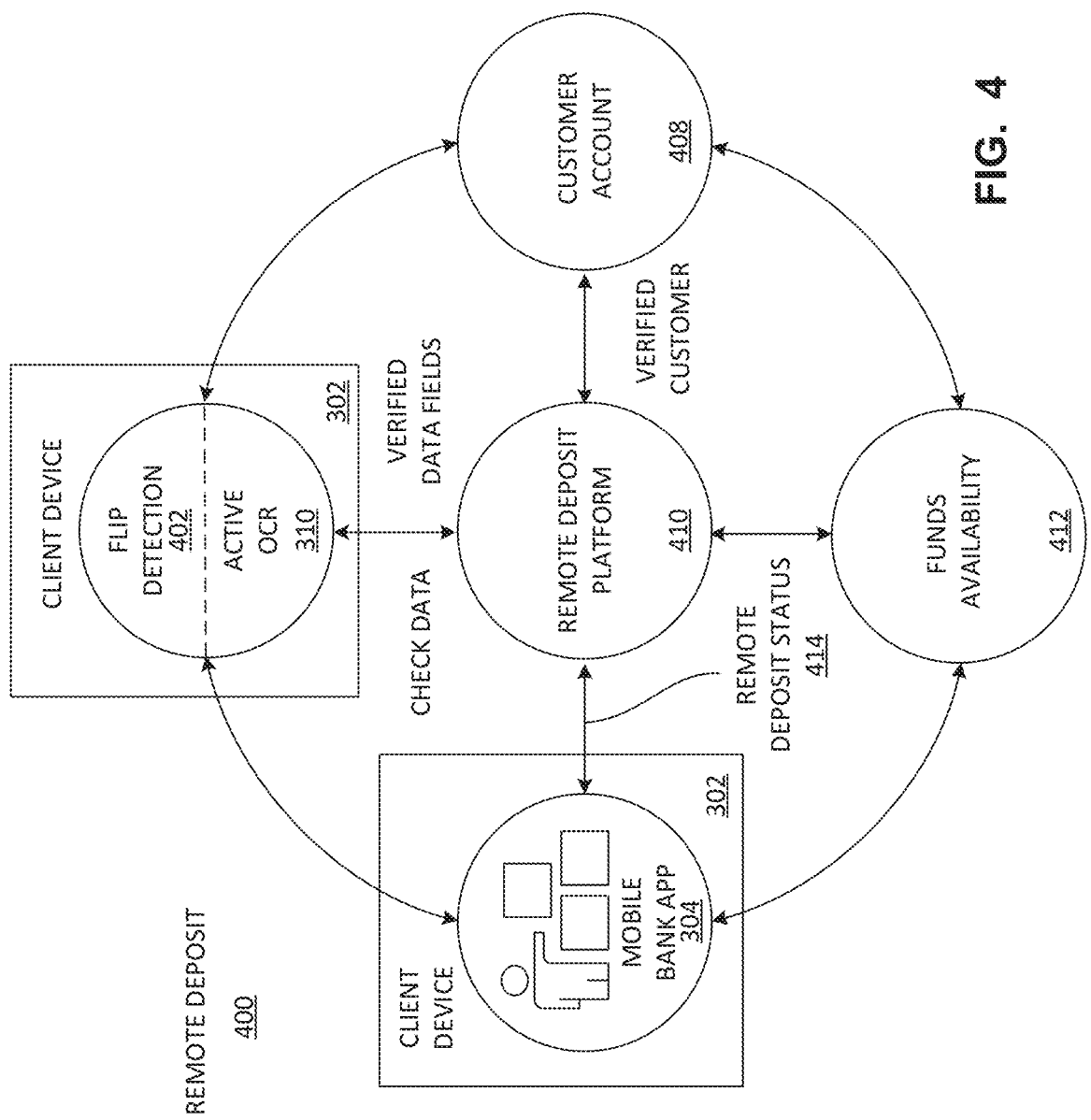
FIG. 4 illustrates an example state diagram of a remote deposit system, according to some embodiments and aspects.
Figure 5:
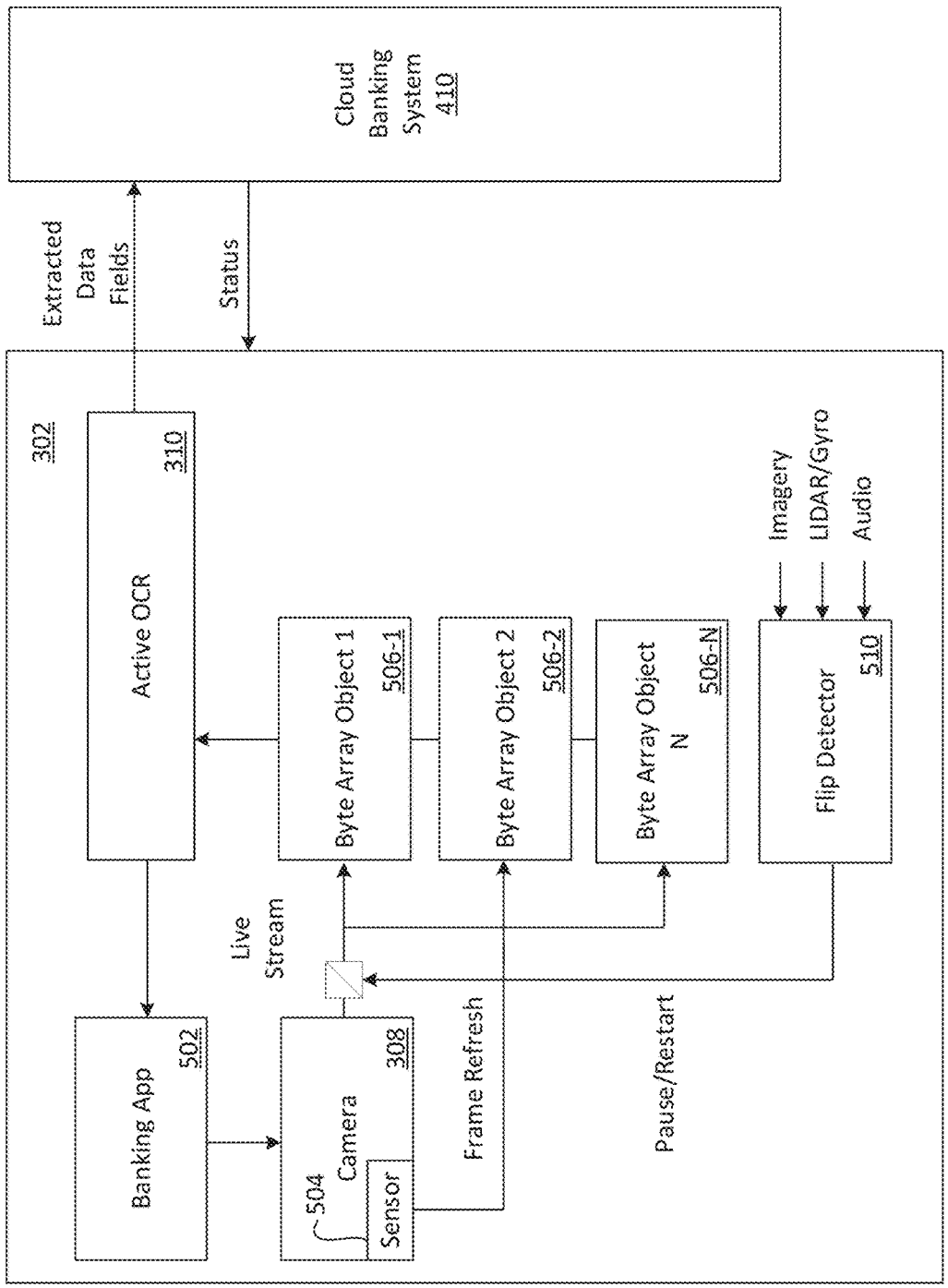
FIG. 5 illustrates an example diagram of a client computing device, according to some embodiments and aspects.

Various aspects of this disclosure may be implemented using and/or may be part of remote deposit systems shown in FIGS. 3-5. It is noted, however, that this environment is provided solely for illustrative purposes, and is not limiting. Aspects of this disclosure may be implemented using and/or may be part of environments different from and/or in addition to the remote deposit system, as will be appreciated by persons skilled in the relevant art(s) based on the teachings contained herein. An example of the remote deposit system shall now be described.

FIG. 1 illustrates an example remote check capture 100, according to some embodiments and aspects. Operations described may be implemented by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 1, as will be understood by a person of ordinary skill in the art.

Sample check 106, may be a personal check, paycheck, or government check, to name a few. In some embodiments, a customer will initiate a remote deposit check capture from their mobile computing device (e.g., smartphone) 102, but other digital video camera devices (e.g., tablet computer, personal digital assistant (PDA), desktop workstations, laptop or notebook computers, wearable computers, such as, but not limited to, Head Mounted Displays (HMDs), computer goggles, computer glasses, smartwatches, etc., may be substituted without departing from the scope of the technology disclosed herein. For example, when the document to be deposited is a personal check, the customer will select a bank account (e.g., checking or savings) into which the funds specified by the check are to be deposited. Content associated with the document include the funds or monetary amount to be deposited to the customer's account, the issuing bank, the routing number, and the account number. Content associated with the customer's account may include a risk profile associated with the account and the current balance of the account. Options associated with a remote deposit process may include continuing with the deposit process or cancelling the deposit process, thereby cancelling depositing the check amount into the account.

Mobile computing device 102 may communicate with a bank or third party using a communication or network interface (not shown). Communication interface may communicate and interact with any combination of external devices, external networks, external entities, etc. For example, communication interface may allow mobile computing device 102 to communicate with external or remote devices over a communications path, which may be wired and/or wireless (or a combination thereof), and which may include any combination of LANs, WANs, the Internet, etc. Control logic and/or data may be transmitted to and from mobile computing device via a communication path that includes the Internet.

In an example approach, a customer will login to their mobile banking app, select the account they want to deposit a check into, then select, for example, a "deposit check" option that will activate their mobile device's camera 104 (e.g., open a camera port). One skilled in the art would understand that variations of this approach or functionally equivalent alternative approaches may be substituted to initiate a mobile deposit.

In a computing device with a camera, such as a smartphone or tablet, multiple cameras (each of which may have its own image sensor or which may share one or more image sensors) or camera lenses may be implemented to process imagery. For example, a smartphone may implement three cameras, each of which has a lens system and an image sensor. Each image sensor may be the same or the cameras may include different image sensors (e.g., every image sensor is 24 MP; the first camera has a 24 MP image sensor, the second camera has a 24 MP image sensor, and the third camera has a 12 MP image sensor; etc.). In the first camera, a first lens may be dedicated to imaging applications that can benefit from a longer focal length than standard lenses. For example, a telephoto lens generates a narrow field of view and a magnified image. In the second camera, a second lens may be dedicated to imaging applications that can benefit from wide images. For example, a wide lens may include a wider field-of-view to generate imagery with elongated features, while making closer objects appear larger. In the third camera, a third lens may be dedicated to imaging applications that can benefit from an ultra-wide field of view. For example, an ultra-wide lens may generate a field of view that includes a larger portion of an object or objects located within a user's environment. The individual lenses may work separately or in combination to provide a versatile image processing capability for the computing device. While described for three differing cameras or lenses, the number of cameras or lenses may vary, to include duplicate cameras or lenses, without departing from the scope of the technologies disclosed herein. In addition, the focal lengths of the lenses may be varied, the lenses may be grouped in any configuration, and they may be distributed along any surface, for example, a front surface and/or back surface of the computing device.

In one non-limiting example, active OCR processes may benefit from image object builds generated by one or more, or a combination of cameras or lenses. For example, multiple cameras or lenses may separately, or in combination, capture specific blocks of imagery for data fields located within a document that is present, at least in part, within the field of view of the cameras. In another example, multiple cameras or lenses may capture more light than a single camera or lens, resulting in better image quality. In another example, individual lenses, or a combination of lenses, may generate depth data for one or more objects located within a field of view of the camera.

Using the camera 104 function on the mobile computing device 102, the customer captures live video from a field of view 108 that includes at least a portion of one side of a check 112. Typically, the camera's field of view 108 will include at least the perimeter of the check. However, any camera position that generates in-focus video of the various data fields located on a check may be considered. Resolution, distance, alignment, and lighting parameters may require movement of the mobile device until a proper view of a complete check, in-focus, has occurred. In some aspects, camera 104, LIDAR sensor 114, microphone 116, and/or gyroscope sensor 118, may capture image, distance, audio data, and/or angular position to assist in detecting a flipping action, as will be described in greater detail herein.

An application running on the mobile computer device may offer suggestions or technical assistance to guide a proper framing of a check within the mobile banking app's graphically displayed field of view window 110, displayed on a User Interface (UI) instantiated by the mobile banking app. A person skilled in the art of remote deposit would be aware of common requirements and limitations and would understand that different approaches may be required based on the environment in which the check viewing occurs. For example, poor lighting or reflections may require specific alternative techniques. As such, any known or future viewing or capture techniques are considered to be within the scope of the technology described herein. Alternatively, the camera can be remote to the mobile computing device 102. In an alternative embodiment, the remote deposit is implemented on a desktop computing device with an accompanying digital camera.

Sample customer instructions may include, but are not limited to, "Once you've completed filling out the check information and signed the back, it's time to view your check," "For best results, place your check on a flat, dark-background surface to improve clarity," "Make sure all four corners of the check fit within the on-screen frame to avoid any processing holdups," "Select the camera icon in your mobile app to open the camera," "Once you've captured video of the front of the check, flip the check to capture video of the back of the check," "Do you accept the funds availability schedule?," "Swipe the Slide to Deposit button to submit the deposit," "Your deposit request may have gone through, but it's still a good idea to hold on to your check for a few days," "keep the check in a safe, secure place until you see the full amount deposited in your account," and "After the deposit is confirmed, you can safely destroy the check." These instructions are provided as sample instructions or comments but any instructions or comments that guide the customer through a remote deposit session may be included.

Figure 2:
FIG. 2 illustrates example remote deposit Optical Character Recognition (OCR) segmentation, according to some embodiments and aspects.

FIG. 2 illustrates example remote deposit OCR segmentation, according to some embodiments and aspects. Depending on check type, a check may have a fixed number of identifiable fields. For example, a standard personal check may have front side fields, such as, but not limited to, a payor customer name 202 and address 204, check number 206, date 208, payee field 210, payment amount 212, a written amount 214, memo line 216, Magnetic Ink Character Recognition (MICR) line 220 that includes a string of characters including the bank routing number, the payor customer's account number, and the check number, and finally, the payor customer's signature 218. Back side identifiable fields may include, but are not limited to, payee signature 222 and security fields 224, such as a watermark.

While a number of fields have been described, it is not intended to limit the technology disclosed herein to these specific fields as a check may have more or less identifiable fields than disclosed herein. In addition, security measures may include alternative approaches discoverable on the front side or back side of the check or discoverable by processing of identified information. For example, the remote deposit feature in the mobile banking app running on the mobile device 102 may determine whether the payment amount 212 and the written amount 214 are the same. Additional processing may be needed to determine a final amount to process the check if the two amounts are inconsistent. In one non-limiting example, the written amount 214 may supersede any amount identified within the amount field 212.

In one embodiment, active OCR processing of a live video stream of check imagery may include implementing instructions resident on the customer's mobile device to process each of the field locations on the check as they are detected or systematically (e.g., as an ordered list extracted from a byte array output video stream object). For example, in some aspects, the video streaming check imagery may reflect a pixel scan from left-to-right or from top-to-bottom with data fields identified within a frame of the check as they are streamed.

In one non-limiting example, the customer holds their smartphone over a check (or checks) to be deposited remotely while the live video stream imagery may be formed into image objects, such as, byte array objects (e.g., frames or partial frames), ranked by confidence score (e.g., quality), and top confidence score byte array objects sequentially OCR processed until data from each of required data fields has been extracted as described in U.S. application Ser. No. 18/503,787, entitled Burst Image Capture, filed Nov. 7, 2023, and incorporated by reference in its entirety herein. Alternatively, the imagery may be a blend of pixel data from descending quality image objects to form a higher quality (e.g., high confidence) blended image that may be subsequently OCR processed, as per U.S. patent application Ser. No. 18/503,799, filed Nov. 7, 2023, entitled Intelligent Document Field Extraction from Multiple Image Objects, and incorporated by reference in its entirety herein.

In another non-limiting example, fields that include typed information, such as the MICR line 220, check number 206, payor customer name 202 and address 204, etc., may be OCR processed first from the byte array output video stream objects, followed by a more complex or time intensive OCR process of identifying written fields, which may include handwritten fields, such as the payee field 210, signature 218, to name a few.

In another example embodiment, artificial intelligence (AI), such as machine-learning (ML) systems may train a confidence model (e.g., quality confidence) to recognize quality of a frame or partial frame of image data, or an OCR model(s) to recognize characters, numerals or other check data within the data fields of the video streamed imagery. The confidence model and OCR model may be resident on the mobile device and may be integrated with or be separate from a banking application (app). The models may be continuously updated by future images or transactions used to train the model(s).

ML involves computers discovering how they can perform tasks without being explicitly programmed to do so. ML includes, but is not limited to, artificial intelligence, deep learning, fuzzy learning, supervised learning, unsupervised learning, etc. Machine learning algorithms build a model based on sample data, known as "training data," in order to make predictions or decisions without being explicitly programmed to do so. For supervised learning, the computer is presented with example inputs and their desired outputs and the goal is to learn a general rule that maps inputs to outputs. In another example, for unsupervised learning, no labels are given to the learning algorithm, leaving it on its own to find structure in its input. Unsupervised learning can be a goal in itself (discovering hidden patterns in data) or a means towards an end (feature learning).

A machine-learning engine may use various classifiers to map concepts associated with a specific process to capture relationships between concepts (e.g., image clarity vs. recognition of specific characters or numerals) and a success history. The classifier (discriminator) is trained to distinguish (recognize) variations. Different variations may be classified to ensure no collapse of the classifier and so that variations can be distinguished.

In some aspects, machine learning models are trained on a remote machine learning platform (e.g., see FIG. 3, element 329 and FIG. 9) using other customer's transactional information (e.g., previous remote deposit transactions). For example, large training sets of remote deposits with check flipping imagery may be used to normalize prediction data (e.g., not skewed by a single or few occurrences of a data artifact). Thereafter, a predictive model(s) may classify a specific image against the trained predictive model to predict an imagery check position (e.g., front-facing, flipped, back-facing) and generate a confidence score. In one embodiment, the predictive models are continuously updated as new remote deposit financial transactions or check flipping imagery become available.

In some aspects, a ML engine may continuously change weighting of model inputs to increase customer interactions with the remote deposit procedures. For example, weighting of specific data fields may be continuously modified in the model to trend towards greater success, where success is recognized by correct data field extractions or by completed remote deposit transactions. Conversely, input data field weighting that lowers successful interactions may be lowered or eliminated.

FIG. 3 illustrates a remote deposit system architecture 300, according to some embodiments and aspects. Operations described may be implemented by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 3, as will be understood by a person of ordinary skill in the art.

As described throughout, a client device 302 (e.g., mobile computing device 102) implements remote deposit processing for one or more financial instruments, such as checks. The client device 302 is configured to communicate with a cloud banking system 316 to complete various phases of a remote deposit as will be discussed in greater detail hereafter.

In aspects, the cloud banking system 316 may be implemented as one or more servers. Cloud banking system 316 may be implemented as a variety of centralized or decentralized computing devices. For example, cloud banking system 316 may be a mobile device, a laptop computer, a desktop computer, grid-computing resources, a virtualized computing resource, cloud computing resources, peer-to-peer distributed computing devices, a server farm, or a combination thereof. Cloud banking system 316 may be centralized in a single device, distributed across multiple devices within a cloud network, distributed across different geographic locations, or embedded within a network. Cloud banking system 316 can communicate with other devices, such as a client device 302. Components of cloud banking system 316, such as Application Programming Interface (API) 318, file database (DB) 320, as well as backend 322, may be implemented within the same device (such as when a cloud banking system 316 is implemented as a single device) or as separate devices (e.g., when cloud banking system 316 is implemented as a distributed system with components connected via a network).

Mobile banking app 304 is a computer program or software application designed to run on a mobile device such as a phone, tablet, or watch. However, in a desktop application implementation, a mobile banking app equivalent may be configured to run on desktop computers, and web applications, which run in web browsers rather than directly on a mobile device. Apps are broadly classified into three types: native apps, hybrid and web apps. Native applications are designed specifically for a mobile operating system, such as, iOS or Android. Web apps are designed to be accessed through a browser. Hybrid apps may function like web apps disguised in a native container.

Financial instrument imagery may originate from, but is not limited to, video streams (e.g., series of pixels or frames). A customer using a client device 302, operating a mobile banking app 304 through an interactive UI 306, frames at least a portion of a check (e.g., identifiable fields on front or back of check) with a camera 308 (e.g., field of view).

In one aspect, the camera imagery is video streamed as encoded text, such as a byte array. Alternatively, or in addition to, the video is buffered by storing (e.g., at least temporarily) as images or frames in computer memory. For example, live video streamed check imagery from camera 308 is stored locally in image memory 312, such as, but not limited to, a frame buffer, a video buffer, a video streaming buffer, or a virtual buffer.

In a first non-limiting example, by first detecting pixels in a video stream, or image byte array, that contain typed or written image components, with, for example, darker, higher contrast, and common black or blue color values, a confidence score may be calculated based on an overall perceived individual image quality. In some aspects, the confidence score may be predicted by a ML model trained on previous images, assigned confidence scores, and corresponding quality ratings. Alternatively, or in addition to, in one aspect, a total pixel score for each image may be calculated. For example, in some aspects, only pixels in a range of pixel values (e.g., range of known marking pixel values, such as 0-50) may be processed, without processing the remaining pixels. For example, those pixels that only include a high pixel value (e.g., lighter pixel grey values), such as, in a background section of the check may not be included in a generated confidence score. In some aspects, pixels that capture preprinted border pixels also may not be considered in the confidence score. In this aspect, the previously discussed ML models may be trained to recognize the values that represent the written or typed information as well as the preprinted borders. For example, using machine learning, thousands or millions of images may be processed to learn to accurately recognize and categorize these pixels.

In some embodiments, active OCR system 310, resident on the client device 302, processes the highest confidence images based on live video streamed check imagery from camera 308 to extract data by identifying specific data located within known sections of the check to be electronically deposited. In one non-limiting example, single identifiable fields, such as the payor customer name 202, MICR data field 220 identifying customer and bank information (e.g., bank name, bank routing number, customer account number, and check number), date field 208, check amount 212 and written amount 214, and authentication (e.g., payee signature 222) and security fields 224 (e.g., watermark), etc., shown in FIG. 2, are processed by the active OCR system 310.

Active OCR system 310 communicates data extracted from the one or more data fields during the active OCR operation to cloud banking system 316, shown in FIG. 3. For example, the extracted data identified within these fields is communicated to file database (DB) 320 either through a mobile app server 332 or mobile web server 334 depending on the configuration of the client device (e.g., mobile or desktop). In one aspect, the extracted data identified within these fields is communicated through the mobile banking app 304.

Alternatively, or in addition to, a thin client (not shown) resident on the client device 302 processes extracted fields locally with assistance from cloud banking system 316. For example, a processor (e.g., CPU) implements at least a portion of remote deposit functionality using resources stored on a remote server instead of a localized memory. The thin client connects remotely to the server-based computing environment (e.g., cloud banking system 316) where applications, sensitive data, and memory may be stored.

In one embodiment, imagery with a highest confidence score is processed from live video stream check imagery from camera 308, as communicated from an activated camera over a period of time, until an active OCR operation has been completed. For example, a highest confidence scored image in a plurality of images, or partial images, is processed by active OCR system 310 to identify as many data fields as possible. Subsequently, the next highest confidence scored image is processed by active OCR system 310 to extract any data fields missing from the first image OCR and so on until all data fields from the check have been captured. Alternatively, or in addition to, specific required data fields (e.g., amount, MICR, etc.) may be identified first in a first OCR of a highest confidence scored image or partial image, followed by subsequent data fields (e.g., signature) in lower confidence scored mages.

In one embodiment, a flip detector 314 detects a check position sequence of front facing, flip, and back facing. As described in greater detail in FIGS. 5-8, various mechanisms may detect this sequence based on any of, or a combination of, position, vision, sound, or multiple document analytics.

Backend 322, may include one or more system servers processing banking deposit operations in a secure environment. These one or more system servers operate to support client device 302. API 318 is an intermediary software interface between mobile banking app 304, installed on client device 302, and one or more server systems, such as, but not limited to the backend 322, as well as third party servers (not shown). The API 318 is available to be called by mobile clients through a server, such as a mobile edge server (not shown), within cloud banking system 316. File DB stores files received from the client device 302 or generated as a result of processing a remote deposit.

Profile module 324 retrieves customer profiles associated with the customer from a registry after extracting customer data from front or back images of the financial instrument. Customer profiles may be used to determine deposit limits, historical activity, security data, or other customer related data.

Validation module 326 generates a set of validations including, but not limited to, any of: mobile deposit eligibility, account, image, transaction limits, duplicate checks, amount mismatch, MICR, multiple deposit, etc. While shown as a single module, the various validations may be performed by, or in conjunction with, the client device 302, cloud banking system 316 or third party systems or data.

Customer Accounts 328 (consistent with customer's accounts 408) includes, but is not limited to, a customer's banking information, such as individual, joint, or commercial account information, balances, loans, credit cards, account historical data, etc.

ML Platform 329 may generate a trained flip detection model, quality confidence model, and/or OCR model (e.g., active OCR 310) using a ML engine. This disclosure is not intended to limit the ML Platform 329 to only flip detection, confidence, active OCR, or OCR model generation, as it may also include, but not be limited to, remote deposit models, risk models, funding models, security models, etc.

When remote deposit status information is generated, it is passed back to the client device 302 through API 318 where it is formatted for communication and display on the client device 302 and may, for example, communicate a funds availability schedule for display or rendering on the customer's device through the mobile banking app UI 306. The UI may instantiate the funds availability schedule as images, graphics, audio, additional content, etc.

Pending deposit 330 includes a profile of a potential upcoming deposit(s) based on an acceptance by the customer through UI 306 of a deposit according to given terms. If the deposit is successful, the flow creates a record for the transaction and this function retrieves a product type associated with the account, retrieves the interactions, and creates a pending check deposit activity.

Alternatively, or in addition to, one or more components of the remote deposit process may be implemented within the client device 302, third party platforms, the cloud-based banking system 316, or distributed across multiple computer-based systems. The UI may instantiate the remote deposit status as images, graphics, audio, additional content, etc. In one technical improvement over current processing systems, the remote deposit status is provided mid-video stream, prior to completion of the deposit. In this approach, the customer may terminate the process prior to completion if they are dissatisfied with the remote deposit status.

In one aspect embodiment, remote deposit system 300 tracks customer behavior. For example, did the customer complete a remote deposit operation or did they cancel the request? In some aspects, the completion of the remote deposit operation reflects a successful outcome, while a cancellation reflects a failed outcome. In some aspects, this customer behavior, not limited to success/failure, may be fed back to the ML platform 329 to enhance future training of any of the ML models disclosed herein. For example, in some embodiments, one or more inputs to the ML models may be weighted differently (higher or lower) to effect a predicted higher successful outcome.

FIG. 4 illustrates an example state diagram of a remote deposit system, according to some embodiments and aspects. The remote deposit 400 system may include one or more system servers processing banking deposit operations in a secure closed loop. While described for a mobile computing device, desktop solutions may be substituted without departing from the scope of the technology described herein. These system servers may operate to support mobile computing devices from the cloud. It is noted that the structural and functional aspects of the system servers may wholly or partially exist in the same or different ones of the system servers or on the mobile device itself. Operations described may be implemented by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 4, as will be understood by a person of ordinary skill in the art.

In one non-limiting example, a customer using a client device 302 (e.g., smartphone 102), operating a mobile banking app 304, frames at least a portion of a check within a field of view of an active camera of client device 302. As previously described, the imagery within the field of view may, in one aspect, be configured as a live video stream. In one embodiment, forming of image objects (e.g., byte array objects) from a live video stream may be paused during a flip detection 402 sequence and then resume the formation of byte array objects when the flip has been completed. The active OCR 310 extracts data fields from the formed byte array objects. For example, the active OCR extracts or identifies a check date, check number, payor, payee, amount, payee information, and bank information, to name a few.

While extracting identifiable data from surfaces of the check is a primary output of the active OCR, additional post-processing may be needed to further confirm or verify the data. Additional post active OCR processing may include, but is not limited to, verification of data extracted from the fields based on a comparison with historical customer account data found in the customer's account 408 or the payor's account. The customer account 408, for purposes of description, may be the payee's account, the payor's account or both. For example, a payee's account historical information may be used to calculate a payee's funds availability 412 schedule, while a payor's account may be checked for funds to cover the check amount. Customer account 408 identification, may include single or multiple level login data from mobile banking app 304 to initiate a remote deposit. Alternately, or in addition to, the extracted payee field 210 or the payee signature 222 may be used to provide additional authentication of the customer.

In one non-limiting example, an address may be checked against the current address found in a data file of customer account 408. In another non-limiting example, post active OCR processing may include checking a signature file within customer account 408 to verify the payee or payor signatures. It is also contemplated that a third party database can be checked for funds and signatures for checks from payors not associated with the customer's bank. Additional known OCR post processing techniques may be substituted without departing from the scope of the technology described herein.

Remote deposit platform 410 receives the extracted data fields of the check from the client device 302. In one non-limiting example, single identifiable data fields, such as the check field 206, date field 208, payee field 210, amount field 212, etc., are sequentially extracted from sequential confidence scored images (e.g., highest score to lowest score) as communicated by the active OCR system 310 in real-time as they are detected and OCR processed. For example the MICR line 220 that includes a string of characters including the bank routing number and the customer's account number, may be processed before other data fields using a highest confidence scored image, or partial image, to immediately initiate a verification of the customer, while the active OCR processes the remaining fields on one or more additional confidence scored images, or partial images. In another non-limiting example, the amount fields may be processed to initiate a funds availability process before the remaining data fields have been extracted. Alternatively, or in addition to, the active OCR process may have a time ordered sequence of fields to be processed. Alternatively, or in addition to, all identifiable check fields are processed simultaneously in parallel by the active OCR system 310 across multiple confidence scored images, or partial images.

Active OCR system 310 communicates one or more data fields extracted in the OCR operation to a funds availability model 412. For example, active OCR 310 communicates customer data (e.g., name, address, account number, bank information (e.g., routing information), check number, check amount (e.g., funding amount needed), authorization and anti-fraud information (e.g., signature verifications, watermark or other check security imagery), etc. Funds availability model 412 may return a fixed or dynamically modifiable funds availability schedule to the UI 306 on the client device 302.

Remote deposit platform 410 computes a funds availability schedule based on one or more of the received data fields, customer history received from the customer's account 408, bank funding policies, legal requirements (e.g., state or federally mandated limits and reporting requirements, etc.), or typical schedules stored within funds availability platform 412, to name a few. For example, the active OCR system 310 identifies the MICR data as a verified data field that may be used to access a customer's account 408. This access allows the bank identified in the MICR to provide a history of the customer's account 408 to the Remote deposit platform 410. Early access to the customer's account or account information may also provide a verified customer for security purposes to eliminate or reduce fraud early in the remote deposit process. Accordingly, enhancing early fraud detection is a technical improvement of the disclosed technology over existing systems.

Remote deposit platform 410 communicates a remote deposit status 414 to the customer's device. For example, the acceptance of the active OCR processed data is communicated. Alternatively, a request to continue pointing the camera at one or more sides of the check is communicated to and rendered as on-screen instructions on the client device 302, within one or more user interfaces (UIs) of the customer device's mobile banking app 304. The rendering may include imagery, text, or a link to additional content. The UI may instantiate the remote deposit status 414 as images, graphics, audio, etc. In another technical improvement over existing systems, the remote deposit status is provided mid-video stream, prior to completion of the deposit. In this approach, the customer may terminate the process prior to completion if they are dissatisfied with the remote deposit status 414 or if they identify that an error has occurred.

In one embodiment, remote deposit platform 410 tracks customer behavior. For example, it can assess whether the customer completes a remote deposit operation or cancels the request. In some aspects, the completion of the remote deposit operation reflects a successful outcome, while a cancellation reflects a failed outcome. In some aspects, this customer behavior, not limited to success/failure, may be fed back to a ML system 339 within the remote deposit platform 410 to enhance future training of a ML OCR model (e.g., active OCR model) or remote deposit models. For example, in some embodiments, one or more inputs to the ML funding models may be weighted differently (higher or lower) to effect a predicted higher successful outcome.

Alternatively, or in addition to, one or more components of the remote deposit flow may be implemented within the customer device, third party platforms, a cloud-based system, distributed across multiple computer-based systems, or combinations thereof.

FIG. 5 illustrates an example diagram of a client device 302, according to some aspects. Operations described may be implemented by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 5, as will be understood by a person of ordinary skill in the art.

In one embodiment, banking app 502 is opened on the client device 302 and the deposit check function selected to initiate a remote deposit process. A camera 308 is activated to initiate a live stream of video from a field of view of the camera 308. The camera may output, for display on user interface (UI) 306 (shown in FIG. 3), one or more video frames having one or more images (e.g., images of real-world objects) that are viewable by camera 308. A video frame may include one or more real-world objects. For instance, a video frame may represent an entire group of checks within a field of view of camera 308, or may represent one or more individual objects within the group. In one aspect, the video frame, or partial video frame of decodable check indicia may be provided by a raw video stream, byte array object(s), as a compressed video stream or byte array, and/or a partially compressed video stream or byte array.

The raw video stream may be detected by an active-pixel sensor 504 (such as a complementary metal-oxide-semiconductor (CMOS) image sensor or a charge-coupled device (CCD). In CCDs, there is a photoactive region (an epitaxial layer of silicon), and a transmission region made out of a shift register. An image is first projected through a lens onto the photoactive region of the CCD, causing each capacitor of a capacitor array to accumulate an electric charge proportional to the light intensity at that location. A one-dimensional array, used in line-scan cameras, captures a single slice of the image, whereas a two-dimensional array, used in video and still cameras, captures a two-dimensional picture corresponding to the scene projected onto the focal plane of the sensor. Once the array has been exposed to the image, a control circuit causes each capacitor to transfer its contents to its neighbor (operating as a shift register). The last capacitor in the array dumps its charge into a charge amplifier, which converts the charge into a voltage. By repeating this process, the controlling circuit converts the entire contents of the array in the semiconductor to a sequence of voltages. These voltages are then sampled, digitized, and may be stored in computer memory within client device 302, such as image memory 312.

In a non-limiting example, the live video streamed image data may be assembled into one or more byte array objects 506 (1-N), such as frames, or partial frames, of image content. In one aspect, a data signal from active-pixel sensor 504 (e.g., CMOS or CCD) on camera 308 notifies the banking app when an entire image sensor has been read out as a frame of video. In this approach, the active-pixel sensor 504 is cleared of electrons before a subsequent exposure to light and a next frame of an image captured. This clearing function or frame refresh may be conveyed to the banking app 502, or the active OCR system 310, to indicate that the byte array object constitutes a complete frame of video data. In some aspects, the images from the raw video stream that are formed into byte array objects may be first rectified to correct for distortions based on an angle of incidence, may be rotated to align the imagery, may be filtered to remove obstructions or reflections, and may be resized to correct for size distortions using known image processing techniques. In one aspect, these corrections may be based on recognition of corners or borders of the check as a basis for image orientation and size, as is known in the art.

In one non-limiting example, a series of byte array objects 506 (1-N) are initially formed as sequential sensor frame refresh signals are received. When flip detector 510 detects a flip action, during a flip sequence of front facing, flip, back facing, a pause signal stops the forming of byte array objects until the flip sequence is completed, where a restart signal continues the forming of byte array objects.

In one aspect, LIDAR, resident on the client device, is configured to detect the flip sequence by determining a range of distances of the check from the client device. For example, by targeting the check, the surface the check is positioned on, or a combination of both, a laser generates light pulses that are reflected from these objects and the time for the reflected light to return to the receiver is measured as a distance. LIDAR may operate in a fixed direction (e.g., vertical) or it may scan multiple directions, in which case it is known as LIDAR scanning or 3D laser scanning, a special combination of 3-D scanning and laser scanning. In the various embodiments and aspects disclosed herein, the LIDAR functionality is built-in to the client device 302. In some aspects, gyroscope data may assist LIDAR functionality by providing angular measurements other than distance. In this aspect, distance is combined with angular position of the client device 302 to provide a clearer understanding of a relationship of the client device 302 to the check 108 and/or the surface that it rests on.

In another aspect, audio, for example captured by a microphone on the client device, is configured to detect the flip sequence by determining sounds that indicate that a flip is occurring, for example, a user's spoken words or ML model analytics of known flipping sounds.

In another aspect, imagery, for example captured by the camera 308, is analyzed using computer vison techniques to detect the flip sequence by determining images that indicate that a flip is occurring, for example, a sudden out-of-focus, or recognition of orientation and/or position of the check, or a ML model analytics of known flipping imagery.

While any portion of a byte array may be OCR processed during data field captures, in some embodiments, a byte array object 506 (1-N) of an entire frame, or multiple frames, may be OCR processed sequentially until all data fields have been extracted. For example, multiple images or multiple image portions may be processed to collectively overcome low quality image captures, such as, but not limited to those images that are missing pixels, that include shadowing, that are taken from sharp angles, or that are off-centered, to name a few. In a non-limiting example, a first image may have a right corner missing. A second image may be subsequently OCR processed to capture any data fields that may be located in the missing corner. The technology described herein extracts as many fields from a byte array object, including a frame, or at least a portion of a frame, and continues the extraction process, processing as many images or image portions, until all data fields have been extracted. Continuing from the above example, if only a lower right corner of an image is missing, a byte array substantially formed from pixels originating from the lower right corner of the check image may be OCR processed to capture the missing data field(s) using any of the techniques disclosed herein. Corner and position designations may be generated based on the recognition of check border or edges.

This extracted data may be continuously transmitted, periodically transmitted, or be transmitted after completion of the active OCR process (e.g., after all data fields are extracted), as check data fields to a cloud banking system 316 via a network connection.

In one aspect, imagery of a first side is processed, followed by a flip pause and then processing of second side imagery. Alternatively, or in combination, the first side and second side imagery is processed together or in parallel using the byte array objects formed before and after the flip action.

In some embodiments, the remote deposit platform 410, as previously described in FIG. 4, may be used to assist implementation of the localized client device 302 OCR processing, or active OCR 310 processing. In a non-limiting example, computer vision algorithms for OCR processing may use large language models (LLM). A large language model is a language model characterized by emergent properties enabled by its large size. As language models, they work by taking an input text and repeatedly predicting the next token or word. They may be built with artificial neural networks, pre-trained using self-supervised learning and semi-supervised learning, typically containing tens of millions to billions of weights. In some aspects, LLM includes Natural Language Processing (NLP). One goal is a computer capable of "understanding" the contents of images, including the contextual nuances of the language within them. The technology can then accurately extract information and insights contained in the images as well as categorize and organize the images or fields within images themselves. LLM and NLP functionality may be implemented on the remote deposit platform 410 to train and improve the previously described ML OCR models that may be operative with the mobile device for the localized active OCR processing.

The technical solution disclosed above allows video capture of both sides of the financial document (e.g., check), without first requiring the user to stop and start the process to capture individual check images and communication of the image captures to a remote OCR processing system. This solution improves the quality of the check capture process, accelerates the remote check deposit process, and allows mid-video stream alterations or improvements, for example, real-time image quality guidance or customer inputs (e.g., mid-video stream cancelation), as well as the other technical advantages described throughout this disclosure.

Figure 6:
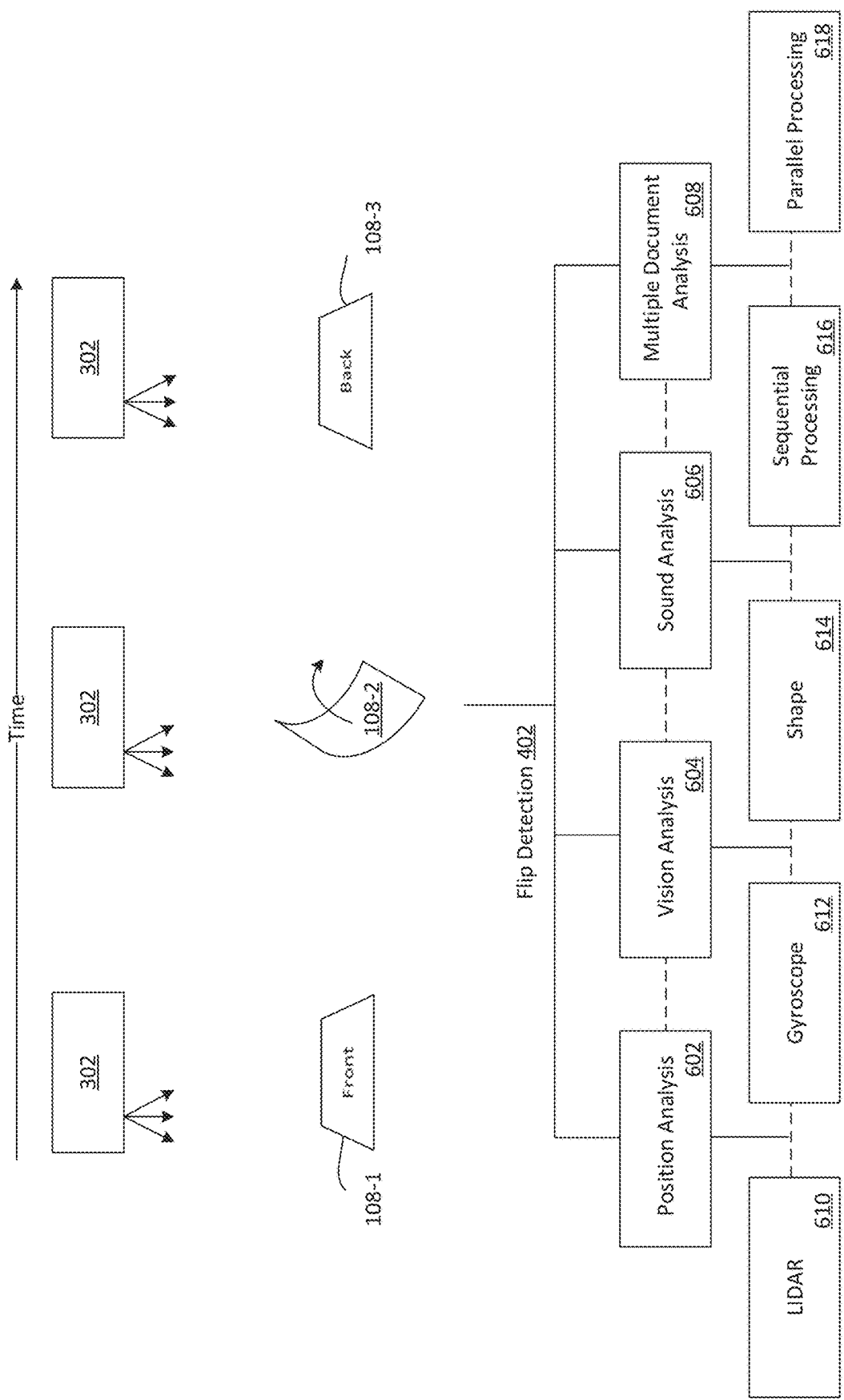
FIG. 6 illustrates an example managed video capture, according to some embodiments and aspects.

FIG. 6 illustrates an example diagram of a client device 302, according to some aspects. Operations described may be implemented by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 6, as will be understood by a person of ordinary skill in the art.

As shown, client device 302 captures a video sequence of a check 108 in multiple positions that includes at least a first or front facing position (108-1), flip position(s) (108-2), and second or back facing position (108-3). In one aspect, a flip detector 314 detects this check position sequence. Flip detection 402 may be implemented in various aspects as will be described in greater detail hereafter.

In a first aspect, a position analysis module 602 may continuously monitor the check position during video capture. Position analysis module 602 may include LIDAR sensor 610 with a distance-based analysis. LIDAR measures reflected light energy to detect distances to an object that reflects the light energy. For example, a LIDAR sensor 610 may determine that a check 108 is within a known distance or distance range for proper capture (e.g., in focus) and is not moving (e.g., constant distance or low rate of distance changes) or, conversely, is moving (e.g., no longer constant or is incurring a high rate of distance changes) during a flip sequence. The LIDAR approach is described in greater detail in FIG. 7.

Alternatively, or in addition to, position analysis module 602 may include gyroscopic components resident on the client device. A gyroscope 612 (consistent with gyroscope 118) is a device used for measuring or maintaining orientation and angular velocity or position. In a non-limiting example, it may be implemented with a (micro-electromechanical system) MEMS system that can range from several millimeters to less than one micrometer. For example, gyroscope 612 supports confirming a positioning of the client device 302 in relationship to the check or supporting surface. The gyroscope provides a technical solution to distinguish whether the client device is moving or the check is moving (e.g., being flipped). In a non-limiting example, the gyroscope confirms that the client device 302 is not being moved erratically (e.g., within a steady state range), based on the gyroscopic data. For example, if the user drops the client device during video capture, it may be improperly defined as a check flip. Therefore, the gyroscope 612 establishes relative positioning. In some aspects, movement of the client device 302, as detected by the LIDAR and/or gyroscope, may be used to calibrate the steady state range. For example, during a camera calibration phase, it is determined that the user normally moves the client device 302 between two and four inches and rotates it between 5 and 10 degrees as they capture video. These ranges are exemplary and other ranges are within the scope of this disclosure.

In a second aspect, a vision analysis module 604 may monitor a check position during a video capture. For example, an image processing system resident on client device 302, may determine an orientation of the check and establish the front facing position 108-1, flip position(s) 108-2 and the back facing position 108-3 by following changes to the original orientation of the check in the video as the check is flipped. Alternatively, or in addition to, the vision analysis module 604 may determine a check position during a video capture by recognizing a sequence, such as, in-focus, out-of-focus, in-focus, as may be found in a check flipping sequence. Alternatively, or in addition to, the vision analysis module 604 may determine a check position during a video capture by recognizing movement of a portion of the check. For example, the image processing system can use computer vision algorithms to recognize a portion of the check, such as border, frame around the check, or a known data field (e.g., check number) and recognize its movement through the check flip sequence through object or motion recognition techniques. In one aspect, a shape 614 analysis may detect changes that occur in the shape of the check as it moved during the flip sequence. For example, the check may appear rectangular, or have a rhomboidal shape when captured at an angle, but would have a quickly changing shape during a flip sequence. In one aspect, the shape, a range of expected shape changes (e.g., for small movements of the client device 302 during video capture), the shape change rate (e.g., very rapid during a flip), or a combination may be used to detect the flip sequence. While described for a few vision analysis examples, this disclosure is not to be limited thereto, as other image processing approaches may be substituted for the examples provided herein.

Figure 9:
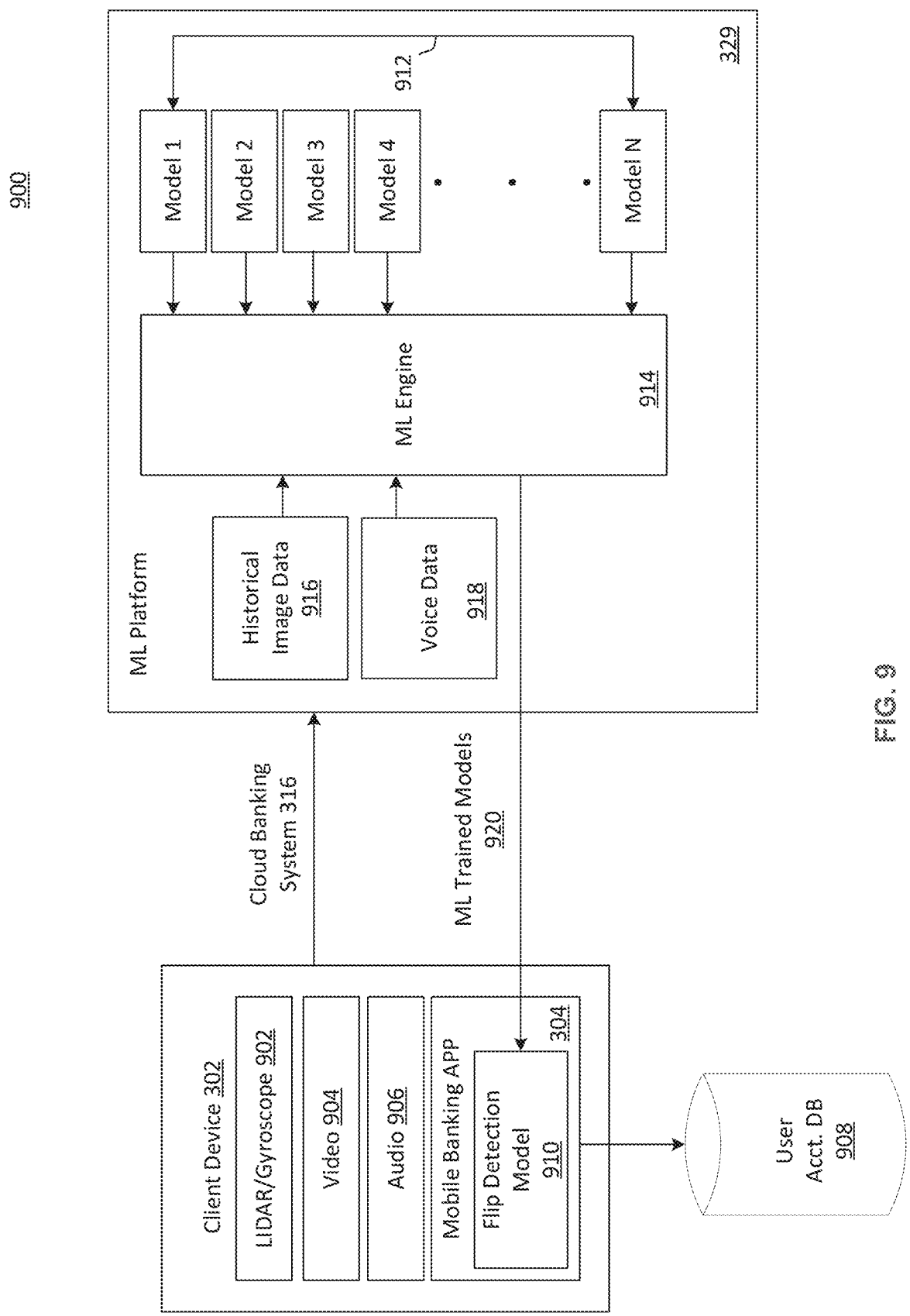
FIG. 9 illustrates a block diagram of a ML system, according to some embodiments and aspects.

In a third aspect, a sound analysis module 606 may monitor a check position during a video capture. For example, an audio processing system resident on client device 302, can determine orientation of the check and establish the front facing position 108-1, flip position(s) 108-2, and the back facing position 108-3 by following sounds that reflect changes as the check is flipped. In one non-limiting aspect, a ML model is trained on hundreds or thousands of check flipping audio recordings with different check sizes and types to generate an audio flipping model that may predict a check flipping sound sequence. FIG. 9 describes ML model building techniques in greater detail. Audio filters may be used to remove background noises (e.g., ambient noise) not associated with the check flipping sequence.

In another non-limiting aspect, a ML model is trained on hundreds or thousands of user voices speaking, for example "I'm flipping the check," or equivalents thereof. In one non-limiting example, a flipping audio model may predict a speaking sequence that parallels a check flipping sequence, based on a natural language processor (NLP) using syntactical analysis to capture and analyze the user's spoken words. Other user spoken words may also be analyzed and excluded as check flipping indicators (e.g., spoken words not directed to a flip action) or be implemented as additional video check capture associated words, such as, but not limited to, "starting video check capture," "flipping the check," "capturing back side," "video capture is completed," or equivalents thereof.

In a fourth aspect, a multiple document analysis module 608 may monitor for a presence of multiple checks during a video capture. For example, an image processing system, resident on client device 302, may determine that more than one check is present in a field of view 108 of the camera (e.g., while the client device 302 is still or as it scans a group of multiple checks). In a first aspect, the user flips a single check and one or more of the disclosed analysis modules (602, 604 or 606) sequentially process 616 each of the individual checks in sequence to determine front facing position 108-1, flip position(s) 108-2, and the back facing position 108-3. In a second aspect, each of the checks are processed in parallel 618 for each of the front facing positions, all checks are then flipped, and then the back facing position is captured for the multiple checks present. In a hybrid model, each of the checks may be processed individually with a plurality processed in parallel. For example, a user may group the checks in rows and process the complete rows in parallel, with any extra checks not in rows (e.g., an odd number) processed individually. In one non-limiting aspect, a ML model is trained on hundreds or thousands of multiple check remote deposit transactions with different numbers of checks, sizes, or types to generate a multiple check model that may predict that multiple checks are being captured by the video. In one aspect, the multiple document analysis module 608 provides individual check positions to the mobile banking app to coordinate capture of front and back facing video for each individual check in the multiple check capture. Alternatively, or in addition to, the multiple document analysis module 608 provides multiple check positions to the mobile banking app to coordinate capture of front and back facing video for a group of checks in the multiple check capture.

While shown as individual aspect implementations for flip detection 402, the analysis modules, 602, 604, 606, or 608 may be implemented separately, or in combination and may be implemented locally, remotely (e.g., cloud banking system 316) or a combination thereof. In addition, check position may be provided to the image processing system, mobile banking app 304, active OCR system 310, image memory, UI or a combination of these client resident systems.

While described for various approaches for detecting a flip occurring during a video capture, any anomaly occurring during video capture may be processed to determine if a flip occurred, or conversely if an error, unrelated to a flip, occurred during the video capture. For example, as previously described, a user may drop their mobile device during capture. In some aspects, the technology disclosed herein may be trained to properly classify such anomalies. In a non-limiting example, a ML model implementing a deep learning algorithm may be trained by many thousands of videos with check flip sequences to detect any anomaly that represents a flip occurrence or represents an error occurring during the video capture that is not related to a flip occurrence. In some aspects, the video may be parsed to detect and process segments in the video that may be associated with these anomalies. For example, a partial image block, a single image block, a combination of image blocks, or a full image frame, may be parsed to detect anomalies.

Figure 7:
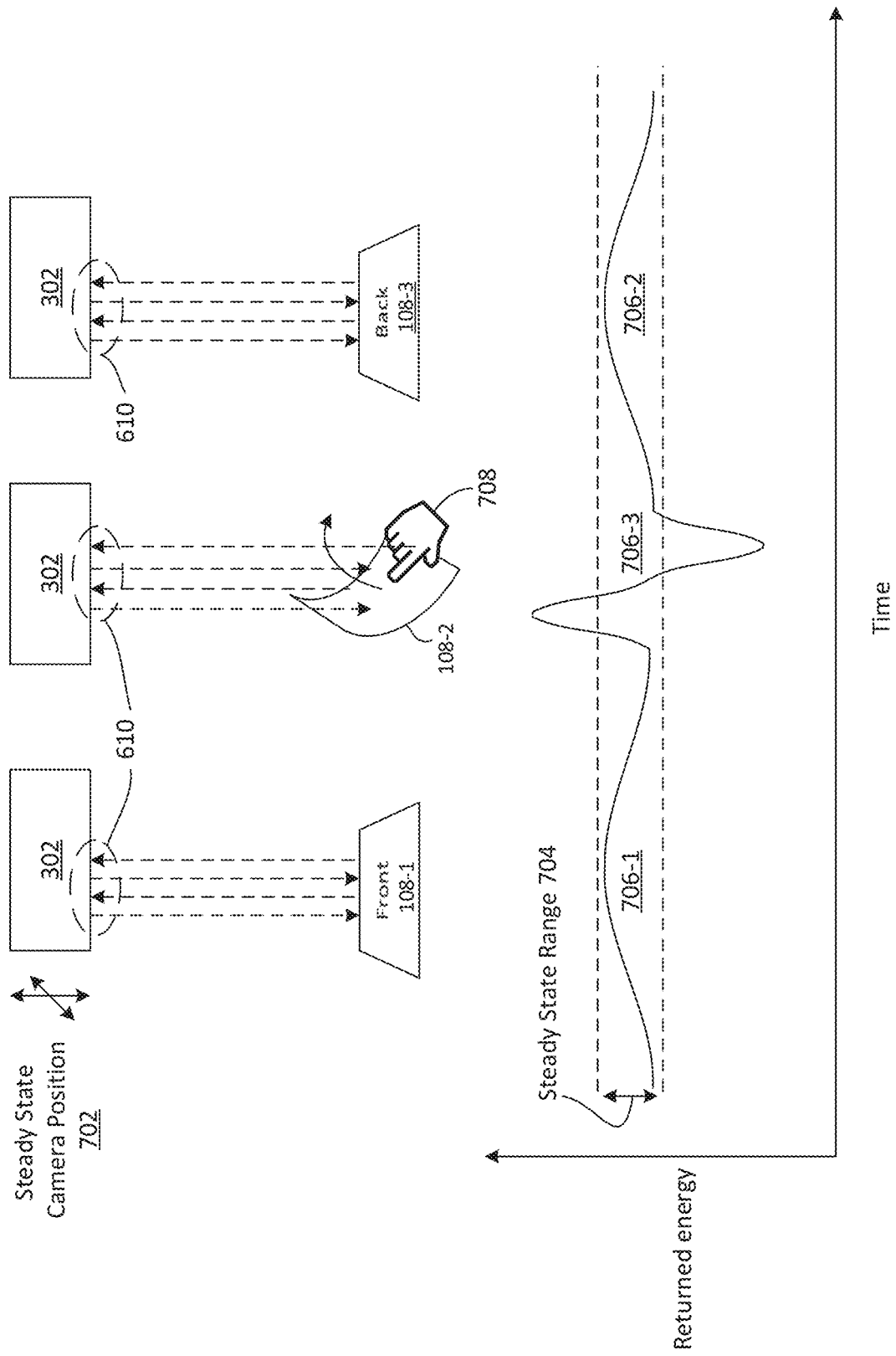
FIG. 7 illustrates a Light Detection and Ranging (LIDAR) managed video capture, according to some embodiments and aspects.

FIG. 7 illustrates an example diagram of a client device 302, according to some aspects. Operations described may be implemented by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 7, as will be understood by a person of ordinary skill in the art.

In some embodiments disclosed herein, a LIDAR sensor 610 (consistent with LIDAR sensor 114), resident on a client device 302, manages image object capture sequences. For example, the customer initiates a remote deposit process by opening an application (App) and then making a request to deposit a check. The process, once initiated, activates a camera on the client device to begin capturing video. The LIDAR sensor 610 is activated to monitor for a steady state range of the camera to check distance and a flipping of the check to distinguish between front-side, flipping and back-side video captures.

In a front facing position 108-1, the client device forms image objects (e.g., frames) from the live streamed video for active OCR processing. The LIDAR sensor 610 monitors for a flipping of the check to distinguish between first-side and second-side video captures. Flipping of the check will cause LIDAR measured distances to fluctuate from a steady state range 704 of measurements based on a check lying on a substantially flat surface and in a motionless state. The steady state range 704 of measurements accounts for some minor fluctuations as the user moves the client device within a steady state camera position 702 during video capture. The camera movement may be within a range of distances orthogonal to the check and/or within an angular range of motion. The steady state range 704 accounts for these camera movement induced fluctuations. In a non-limiting example, these steady state fluctuations may be characterized based on a signal-based envelope detector. An envelope detector (sometimes called a peak detector) may be an electronic circuit that takes a (relatively) high-frequency amplitude modulated signal (e.g., generated by continuous small movements of the camera) as an input and provides an output, which is the demodulated envelope of the original signal. Therefore, the envelope detector generates a smoothed signal 706-1 from a waveform of slight measurement signal variations of moving the client device 302 within an expected range of movements during video capture. A similar waveform 706-2 is generated within the steady state range 704 when the check is in the back facing position lying on a substantially flat surface and in a motionless state.

However, as the check is flipped 108-2, reflections 706-3 from the check and the user's arm, hand(s) or fingers (e.g., shown as hand 708) will cause a sequence of rapid reflected light changes indicating distances outside of the steady state range 704 of measurements (e.g., exceeds a threshold distance or rate of change). While shown as a smooth waveform for diagrammatic purposes, the waveform in practice may be a highly fluctuating signal and include noise contributions from reflections of the user's arm, hands, fingers, or other objects (e.g., watch, clothing, pen in hand, etc.). In one aspect, an amplitude detector may analyze the signal changes outside of the steady state range and determine that a flip is occurring based on exceeding a threshold amplitude.

The LIDAR sensor 610, in some aspects, will cause image object building to pause during the detected flipping action and restart the image object building after flip completion. Therefore, implementing the technology disclosed herein, at least a portion of a remote deposit process will be locally processed to capture imagery and flip detection. These processes may be directed by a mobile banking app or other image processing app and imagery captured in real-time or near real-time. In a preliminary step, to more efficiently detect check positions, a perimeter and orientation of the check is first determined using check orientation and position algorithms.

Figure 8:
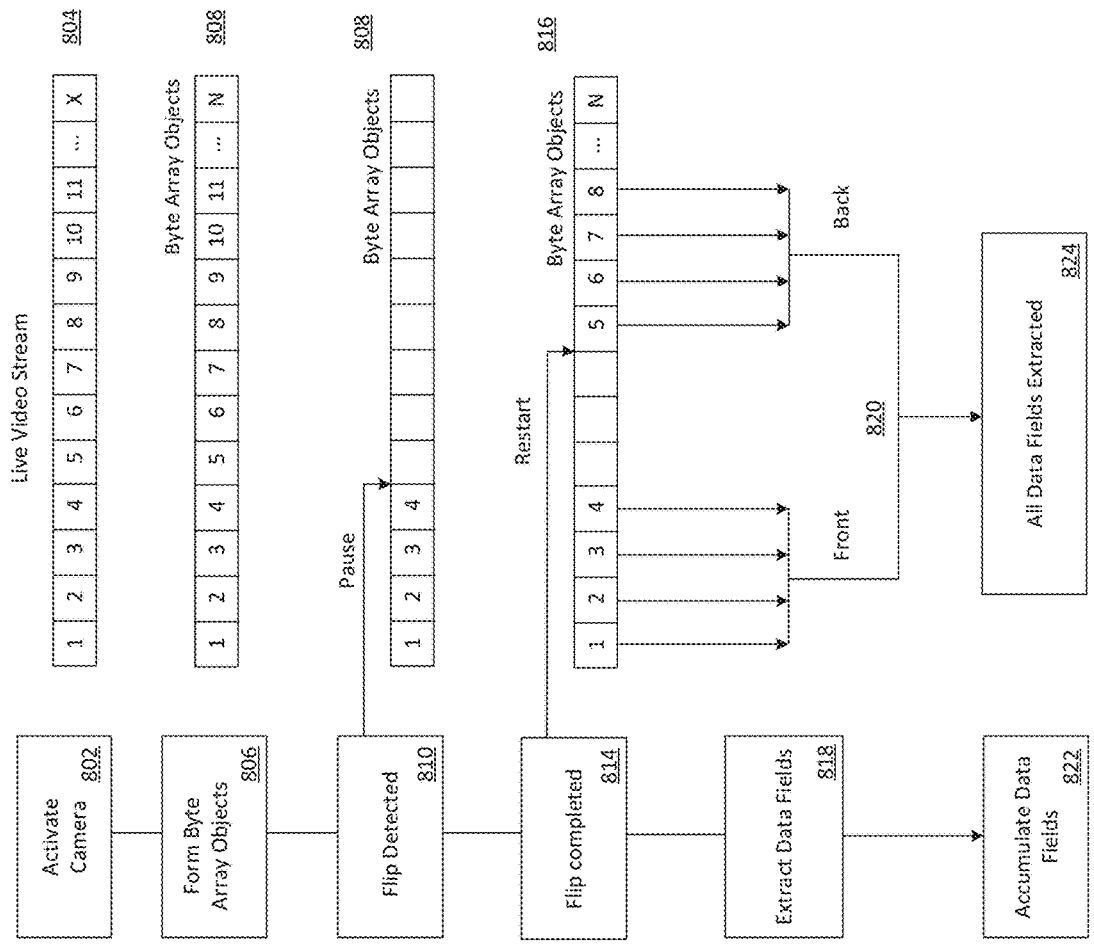
FIG. 8 illustrates a flow diagram for a remote deposit system, according to embodiments and aspects.

FIG. 8 is a flow chart 800 depicting a multiple image OCR or active OCR process for a remote check deposit that can be carried out in line with the discussion above. One or more of the operations in the method depicted by FIG. 8 may be carried out by one or more entities, including, without limitation, client device 302, cloud banking system 318, remote deposit platform 410, or other server or cloud-based server processing systems and/or one or more entities operating on behalf of or in cooperation with these or other entities. Any such entity could embody a computing system, such as a programmed processing unit or the like, configured to carry out one or more of the method operations. Further, a non-transitory data storage (e.g., disc storage, flash storage, or other computer readable medium) could have stored thereon instructions executable by a processing unit to carry out the various depicted operations. In some aspects, the systems described generate and instantiate an active OCR process for a ranked sequence of confidence scored images in a remote deposit environment.

In 802, a mobile banking app 304 initiates a remote deposit by activating a client device 302 camera. For example, a customer using a mobile computing device, operating a mobile banking app, initiates a remote deposit by selecting this option on a UI of the banking mobile app on their mobile computing device. This selection provides instructions to the camera to communicate image data from the field of view of the camera as a raw live video stream 804 of image data 1, 2, 3 . . . X, where X is a number of pixels of image data.

In 806, the raw live image video stream 804, for example, pixels 1, 2, 3 . . . X, is converted to byte array objects 808 (1-N), consistent with previously described byte array objects 508 (1-N). In one aspect, the raw live video stream

804 of image data may be continuously formed into byte array objects until an active OCR process has extracted selected data fields from a first side of the check. Alternatively, the raw live video stream 804 of image data may be continuously formed into byte array objects until an active OCR process has extracted all data fields from the imagery of both sides of the check. In some aspects, formed byte array objects that capture preprinted border pixels also may be considered in a pre-processing check orientation determination. In this aspect, the previously discussed ML models may be trained to recognize the values that represent the preprinted borders. For example, using machine learning, thousands or millions of images may be processed to learn to accurately recognize and categorize these pixels.

Alternatively, or in addition to, segments or blocks within known data field areas on the check may be processed to determine an initial check orientation and determine a side facing the camera of the client device 302. For example, if the check number data field is recognized by the active OCR 310, it may be determined that the front side of the check is facing up, where a security watermark or signature line may be indicative of a back-side facing. Using supervised learning, thousands or millions of images may be processed to learn to recognize a check type and common data fields and their locations relative to a border or side of a check. Alternatively, or in addition to, the two methods described above may be combined.

In 810, a flip action is detected of one or more financial instruments (e.g., checks). When a flip action is detected, the forming of byte array objects is paused. For example, the forming of image objects is paused until the flip has been completed. Alternatively, or in addition to, the image objects are continuously formed (e.g., without a pause), but the image objects captured during the flip are not processed by the active OCR 310 process. In some aspects, the flip action may be predicted by a trained ML model trained on previous document flipping imagery.

In 814, with the flip action completed, the forming of byte array objects is restarted 816 and the active OCR of a second side of the check is performed. The active OCR process will determine a number of byte array objects needed to meet a selected success rate. For example, the camera would remain active until the targeted extractions are available. In another example, for low light environments, a higher number of byte array objects may need to be formed for the active OCR 310 process.

In other aspects, the number M of byte array objects may be based on any of a preset number, a percentage of the total number of byte array objects in the set, or only based on those byte array objects above a selectable quality confidence score, to name a few examples.

In 818, the active OCR 310 processes the first and second side formed byte array objects to extract a target set of data fields (e.g., as shown in FIG. 2). As shown in this example, four data fields were extracted from the first side byte array objects (1-4) and four data fields were extracted from the second side byte array objects 5-8. In each OCR process, a maximum number of data fields are extracted from each of the byte array objects until the target set of data fields has been extracted. The example number of byte array objects used for an active OCR process is shown as four for simplicity purposes. However, the number of byte array objects is not limited and may be hundreds or even thousands of byte array objects until all desired data fields have been extracted. In addition, the byte array objects may include a full frame of data or be any portion of an image formed from the raw live image video stream 804. For example, as an upper corner of an image is being formed into a byte array and the active OCR system 310, in real-time, extracts any data fields located in this portion of the image. In a non-limiting example, as the customer moves their client device 302 around (e.g., standing over the check with at least a portion of the check in the field of view), a live image video stream 804 is being captured that can be formed into byte array objects and active OCR processed.

This approach provides a technical solution to effectively extract data fields from check imagery. For example, a user may move the client device around freely as the camera generates a live video stream of potentially good (in-focus, good lighting, low shading, etc.) and bad quality imagery (e.g., shadows, glare, or off-center) without requiring the user to take a picture or communicate pictures to a remote OCR system, thus allowing for real-time extraction of the check data fields. In addition, an addition technical advantage is achieved by pausing forming byte arrays or active OCR of imagery that is captured during the flip action. This pause reduces errors in captures during the flip as well as efficiently allocating limited client device resources.

During active OCR 310, the images may be first rectified to correct for distortions based on an angle of incidence, or may be rotated to align the images, or may be filtered to remove obstructions or reflections and may be resized to allow same size image overlay configurations. In one aspect, these corrections may be based on recognition of corners or borders of the check.

While described throughout for active OCR processing, in some aspects, the OCR process may be any process that can extract data fields from the formed byte array objects, including remote systems and processes.

FIG. 9 illustrates a block diagram of a ML system, according to some embodiments and aspects. A video capture with flip detection implementation may include one or more system servers processing various banking deposit operations in a secure closed loop. While described for a mobile computing device, desktop solutions may be substituted without departing from the scope of the technology described herein. These system servers may operate to support mobile computing devices from the cloud. It is noted that the structural and functional aspects of the system servers may wholly or partially exist in the same or different ones of the system servers or on the mobile device itself. Operations described may be implemented by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 9, as will be understood by a person of ordinary skill in the art.

In some aspects, a flip detection model 910 may be processed locally on the client device 302 to improve check data field extraction performance, such as accuracy, quality and speed, to name a few. In various aspects, flip detection model 910 may be a standalone model or be integrated within mobile banking app 304 (as shown), or within active OCR system 310. ML models (1-N) 912 may singularly, or collectively, implement any of, but are not limited to, a ML predictive model for flip detection, a ML model for image quality scoring, a ML model for selecting an optimum number of quality scored byte array objects, a ML model for communicating the selected byte array objects to an OCR process, and a ML model for determining when a target set of desired check data fields have been extracted.

In some aspects, LIDAR/gyroscope 902 measurement data may be used by the ML platform to train a ML model 912 for position analysis module 602 to predict check orientation and flipping.

In some aspects, video 904 (e.g., byte array objects) may be used by the ML platform to train a ML model 912 for vision analysis module 604 to predict check orientation and flipping.

In some aspects, audio data 906 may be used by the ML platform to train a ML model 912 for sound analysis module 606 to predict a flipping action based on audio captured by a microphone of the client device.

Training of any of the described ML models may occur remotely from the client device 302 (e.g., in ML platform 329) and be communicated to the client device 302 as one or more ML model(s) 912 are trained and updated. Training may include exposing the ML models to the data of hundreds, thousands, or more of historical images 916, where specific flip sequences and success of subsequent data field extractions may be included in a supervised model build. Image quality thresholds may be selectable and varied during the training process to generate an optimized quality threshold based on a historical correlation with active OCR extracted data fields. Trained ML models 920 may each have varied metadata weightings, performance weightings, or quality weightings, but are not limited to these parameter weightings. One skilled in ML would appreciate that any of the parameters used in the active OCR extraction process, such as, but not limited to, image quality or performance targets may have weighting varied without departing from the scope of the technology disclosed herein.

Machine learning may involve computers learning from data provided so that they carry out certain tasks. For more advanced tasks, it can be challenging for a human to manually create the needed algorithms. This may be especially true of teaching approaches to correctly identify patterns. The discipline of machine learning therefore employs various approaches to teach computers to accomplish tasks where no fully satisfactory algorithm is available. In cases where vast numbers of potential answers exist, one approach, supervised learning, is to label some of the correct answers as valid or successful. For example, a high quality image may be correlated with a confidence score based on previously assigned quality ratings of a number of images. This may then be used as training data for the computer to improve the algorithm(s) it uses to determine future successful outcomes.

The trained ML models 920 (e.g., 1-N) may classify customer's historical image data 916 based on a positive result of OCR extracted data or by negative labels (e.g., low quality or missing extractions, etc.) against the trained predictive model to predict successful extractions and generate or enhance a previous generated model. In one embodiment, the ML models (e.g., models 912, 1-N) are continuously updated as new user financial interactions occur.

As shown, a series of desired models 912, 1-N, may be fed into the ML Engine 914 as predictor models to select a model that may result in optimized check data OCR extractions (e.g., amount, etc.). The ML model(s) 912 may be trained and continuously improved by analyzing relative success over a large data set, where success is measured by quality of OCR data field extractions. ML models 912 may be focused to generate queries for a specific performance level, for example detecting a flip sequence in a minimum time (e.g., less than some number of microseconds).

Video 904 received from the client device, including the byte object arrays used in the active OCR process, may be stored in the User Account DB 908. User Account DB 908 may also store user profile information that may be used with the remote deposit platform 410 to provide account and profile information based on associated identifiers (IDs). Additionally, as specific funds availability schedules are presented to the user, for example, as rendered on their user device 302 through mobile banking app 304, the historical information may be added to the user's profile, and further be stored in the User Account DB 808.

Alternatively, or in addition to, one or more components of the ML platform 329 may be implemented within the user's mobile device, third party platforms, and a cloud-based system, or distributed across multiple computer-based systems.

The various aspects solve at least the technical problems associated with performing OCR operations pre-deposit, without requiring communication of an image capture to a remote OCR system. The various embodiments and aspects described by the technology disclosed herein are able to provide active OCR operations and remote deposit status mid-experience, before the customer completes the deposit and without requiring the customer to provide additional new image captures post image quality or OCR failures.

More specifically, the technical solutions disclosed herein allows video capture of both sides of the financial document (e.g., check), without first requiring the user to stop and start the process to capture individual check images and communication of the image captures to a remote OCR processing system. This solution improves the quality of the check capture process, accelerates the remote check deposit process, and allows mid-video stream alterations or improvements, for example, real-time image quality guidance or customer inputs (e.g., mid-video stream cancelation), as well as the other technical advantages described throughout this disclosure.

Example Computer System

Figure 10:
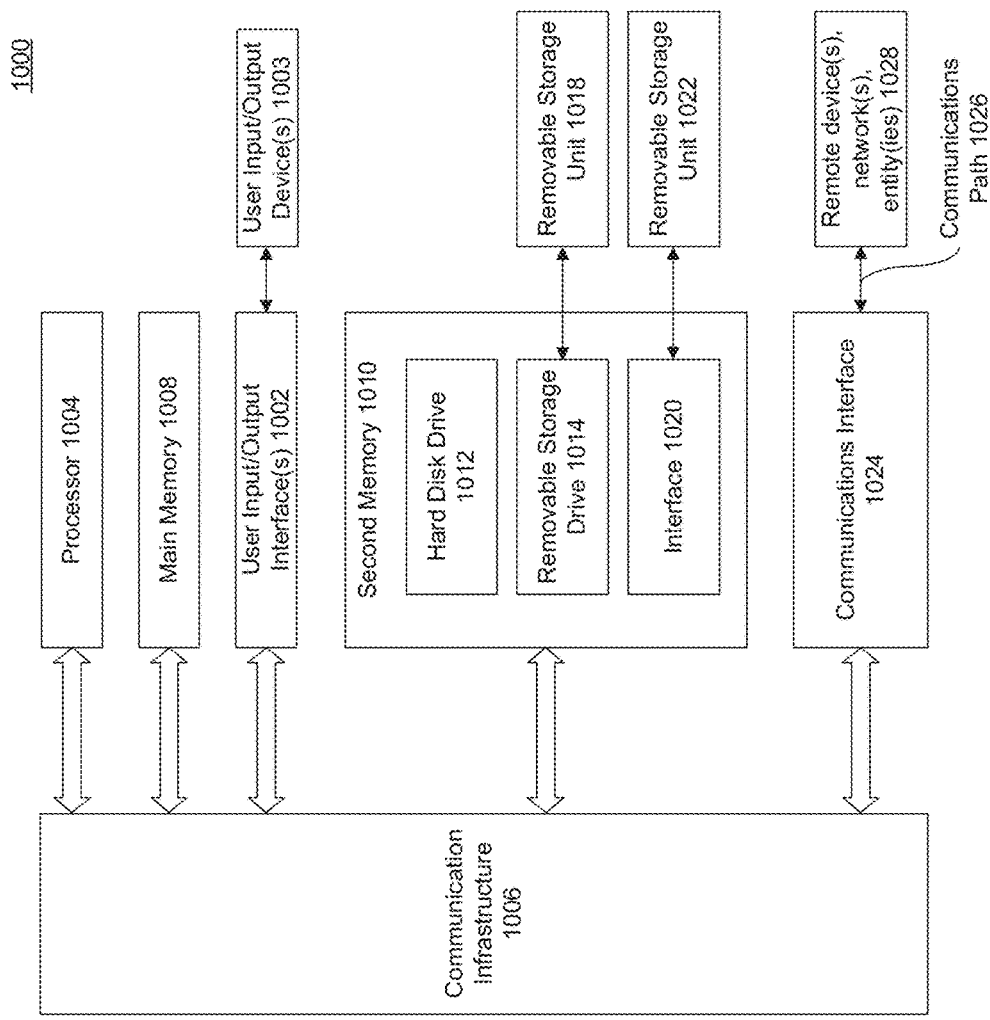
FIG. 10 illustrates an example computer system useful for implementing various embodiments and aspects.

FIG. 10 depicts an example computer system useful for implementing various embodiments.

Various embodiments may be implemented, for example, using one or more well-known computer systems, such as computer system 1000 shown in FIG. 10. One or more computer systems 1000 may be used, for example, to implement any of the embodiments discussed herein, as well as combinations and sub-combinations thereof. For example, the example computer system may be implemented as part of mobile computing device 102, client device 302, cloud banking system 316, etc. Cloud implementations may include one or more of the example computer systems operating locally or distributed across one or more server sites.

Computer system 1000 may include one or more processors (also called central processing units, or CPUs), such as a processor 1004. Processor 1004 may be connected to a communication infrastructure or bus 1006.

Computer system 1000 may also include user input/output device(s) 1002, such as monitors, keyboards, pointing devices, etc., which may communicate with communication infrastructure 1006 through user input/output interface(s) 1002.

One or more of processors 1004 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1000 may also include a main or primary memory 1008, such as random access memory (RAM). Main memory 1008 may include one or more levels of cache. Main memory 1008 may have stored therein control logic (i.e., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 may include a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1018 may read from and/or write to removable storage unit 1018.

Secondary memory 1010 may include other means, devices, components, instrumentalities or other approaches for allowing computer programs and/or other instructions and/or data to be accessed by computer system 1000. Such means, devices, components, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1000 may further include a communication or network interface 1024. Communication interface 1024 may enable computer system 1000 to communicate and interact with any combination of external devices, external networks, external entities, etc. (individually and collectively referenced by reference number 1028). For example, communication interface 1024 may allow computer system 1000 to communicate with external or remote devices 1028 over communications path 1026, which may be wired and/or wireless (or a combination thereof), and which may include any combination of LANs, WANs, the Internet, etc. Control logic and/or data may be transmitted to and from computer system 1000 via communication path 1026.

Computer system 1000 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1000 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1000 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1000, main memory 1008, secondary memory 1010, and removable storage units 1016 and 1022, as well as tangible articles of manufacture embodying any combination of the foregoing. Such control logic, when executed by one or more data processing devices (such as computer system 1000), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 10. In particular, embodiments can operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The breadth and scope of the present invention should not be limited by any of the above-described exemplary embodiments, but should be defined only in accordance with the following claims and their equivalents.

What is claimed is:

1. A computer-implemented method for a remote deposit using a client device, comprising:
   activating, based on a remote deposit application receiving a user request to initiate a remote deposit, a camera on the client device, wherein the activated camera provides access to a field of view of the camera;
   generating, by a Light Detection and Ranging (LIDAR) sensor resident on the client device, data related to a first range of distances of the camera from a first side of a financial instrument viewable within the field of view of the camera;
   forming, while in the first range of distances and from a live video stream generated by the camera, a first set of image objects of at least a portion of the first side of the financial instrument;
   detecting, by the LIDAR sensor, a flip action of the financial instrument to a second side, wherein the flip action is detectable when the LIDAR sensor detects data related to a distance of the camera to the financial instrument that is not within the first range of distances;
   generating, by the LIDAR sensor, data related to a second range of distances of the camera from the second side of the financial instrument viewable within the field of view of the camera; and
   forming, while in the second range of distances and from the live video stream of the camera, a second set of image objects of at least a portion of the second side of the financial instrument.

2. The computer-implemented method of claim 1, further comprising arranging a plurality of pixels into a plurality of byte arrays during the forming of the first set of image objects and the forming of the second set of image objects.

3. The computer-implemented method of claim 2, wherein the plurality of byte arrays comprise a partial frame or an entire frame of the financial instrument.

4. The computer-implemented method of claim 1, further comprising, during the flip action, pausing the forming of the first set of image objects.

5. The computer-implemented method of claim 1, further comprising:
   recognizing a first steady state position based on the first range of distances and recognizing a second steady state position based on the second range of distances, wherein the first steady state position and the second steady state position include movements of the camera below a threshold of movement during generation of the live video stream.

6. The computer-implemented method of claim 5, wherein the threshold of movement includes distances from the camera to the financial instrument that are within a selected range of distances.

7. The computer-implemented method of claim 6, further comprising determining the selected range of distances during calibration of the camera.

8. The computer-implemented method of claim 6, wherein the distances from the camera to the financial instrument exceed a threshold distance during the flip action.

9. The computer-implemented method of claim 6, wherein the distances from the camera to the financial instrument exceed a rate of change during the flip action.

10. The computer-implemented method of claim 6, further comprising analyzing a waveform of movements by the client device when recognizing the first steady state position, the flip action, or when recognizing the second steady state position.

11. The computer-implemented method of claim 10, further comprising detecting a signal envelope that includes at least the first steady state position or the second steady state position when analyzing the waveform of movements by the client device.

12. A system, comprising:
   a memory; and
   at least one processor coupled to the memory and configured to:
   activate, based on a remote deposit application receiving a user request to initiate a remote deposit, a camera on a client device, wherein the activated camera provides access to a field of view of the camera;
   generate, by a Light Detection and Ranging (LIDAR) sensor resident on the client device, data related to a first range of distances of the camera from a first side of a financial instrument viewable within the field of view of the camera;
   form, while in the first range of distances and from a live video stream generated by the camera, a first set of image objects of at least a portion of the first side of the financial instrument;
   detect, by the LIDAR sensor, a flip action of the financial instrument to a second side, wherein the flip action is detectable when the LIDAR sensor detects a deviation of the data from the first range of distances;
   generate, by the LIDAR sensor, a second range of distances of the camera from the second side of the financial instrument viewable within the field of view of the camera; and
   form, while in the second range of distances and from the live video stream of the camera, a second set of image objects of at least a portion of the second side of the financial instrument.

13. The system of claim 12, further configured to arrange a plurality of pixels into a plurality of byte arrays during the forming of the first set of image objects or the forming of the second set of image objects from the live video stream.

14. The system of claim 13, wherein the plurality of byte arrays comprise a partial frame or an entire frame of the document.

15. The system of claim 12, further configured to, during the flip action, pause the forming of the first set of image objects.

16. The system of claim 12, further configured to recognize a first steady state position based on the first range of distances and to recognize a second steady state position based on the second range of distances, wherein the first steady state position and the second steady state position include movements, below a threshold of movement, of the camera during the generation of the live video stream.

17. The system of claim 16, wherein the threshold of movement includes distances from the camera to the financial instrument that are within a selected range of distances.

18. The system of claim 17, further configured to determine the selected range of distances during a calibration of the camera.

19. The system of claim 17, wherein the distances from the camera to the financial instrument exceed a rate of change during the flip action.

20. A non-transitory computer-readable device having instructions stored thereon that, when executed by at least one computing device, cause the at least one computing device to perform operations comprising:

activating, based on a remote deposit application receiving a user request to initiate a remote deposit, a camera, wherein the activated camera provides access to a field of view of the camera;

generating, by a Light Detection and Ranging (LIDAR) sensor resident on the computing device, data related to a first range of distances of the camera from a first side of a financial instrument viewable within the field of view of the camera;

forming, while in the first range of distances and from a live video stream generated by the camera, a first set of image objects of at least a portion of the first side of the financial instrument;

detecting, by the LIDAR sensor, a flip action of the financial instrument to a second side, wherein the flip action is detectable when the LIDAR sensor generates data related to a distance of the camera to the financial instrument that is not within the first range of distances;

generating, by the LIDAR sensor, data related to a second range of distances of the camera from a second side of the financial instrument viewable within the field of view of the camera; and forming, while in the second range of distances and from the live video stream of the camera, a second set of image objects of at least a portion of the second side of the financial instrument.

\* \* \* \* \*